United States Patent [19]

Morris et al.

[11] Patent Number: 5,058,185

[45] Date of Patent: Oct. 15, 1991

[54] OBJECT MANAGEMENT AND DELIVERY SYSTEM HAVING MULTIPLE OBJECT-RESOLUTION CAPABILITY

[75] Inventors: Hugh M. Morris, Gaithersburg; Carol A. Parks, Monrovia; Doraiswamy Rajagopal, Rockville; Gary L. Youngs, Gaithersburg, all of Md.

[73] Assignee: International Business Machines Corporation, Armonk, N.Y.

[21] Appl. No.: 211,722

[22] Filed: Jun. 27, 1988

[51] Int. Cl.⁵ ............................................. G06K 9/36
[52] U.S. Cl. ...................................... 382/41; 382/57; 382/61; 364/518; 364/521
[58] Field of Search ............... 364/518, 521; 382/1.41, 382/57, 61, 91

[56] References Cited

U.S. PATENT DOCUMENTS

| | | | |
|---|---|---|---|
| 4,139,901 | 2/1979 | Ganske et al. | 364/900 |
| 4,164,024 | 8/1979 | Gilbert | 364/900 |
| 4,174,890 | 11/1979 | Johnson et al. | 364/200 |
| 4,197,590 | 4/1980 | Sukonick et al. | 364/900 |
| 4,205,387 | 5/1980 | Ovshinsky et al. | 364/900 |
| 4,485,454 | 11/1984 | Kimoto | 364/900 |
| 4,553,206 | 11/1985 | Smutek et al. | 364/300 |
| 4,553,261 | 11/1985 | Froessl | 382/57 |
| 4,574,395 | 3/1986 | Kato | 382/61 |
| 4,601,003 | 7/1986 | Yoneyama et al. | 364/518 |
| 4,635,136 | 1/1987 | Ciampa et al. | 364/900 |
| 4,672,186 | 6/1987 | Van Tyne | 382/50 |
| 4,727,589 | 2/1988 | Hirose et al. | 382/56 |
| 4,760,606 | 7/1988 | Leswick et al. | 382/61 |

FOREIGN PATENT DOCUMENTS

WO87/04826 8/1987 PCT Int'l Appl. .
WO87/05767 9/1987 PCT Int'l Appl. .
WO87/05768 9/1987 PCT Int'l Appl. .

Primary Examiner—David K. Moore
Assistant Examiner—Jose L. Couso
Attorney, Agent, or Firm—Paul J. Skwierawski; Jeffrey S. LaBaw; John E. Hoel

[57] ABSTRACT

A method and apparatus which allows an object management and delivery system to perform capture, prefetch, display, print and/or modify operations with only a modicum of interaction between the operations of a host computer system and the object management and delivery system. Host computer/object-management system interaction is typically limited to: operation requests transferred from the host computer to the object management system; record registration data transferred from the object management system to notify the host computer that an object record has been stored; and/or error data transferred from the object management system to notify the host computer when the object management system encounters an error in trying to perform an operation requested by the host computer.

24 Claims, 18 Drawing Sheets

RUN LENGTH ENCODED IN 128 BITS    HIGHER RES. BIT PLANE 24=256 BITS

RUN LENGTH ENCODED IN 48 BITS    LOWER RES. BIT PLANE 28=64 BITS

FIG. 10.

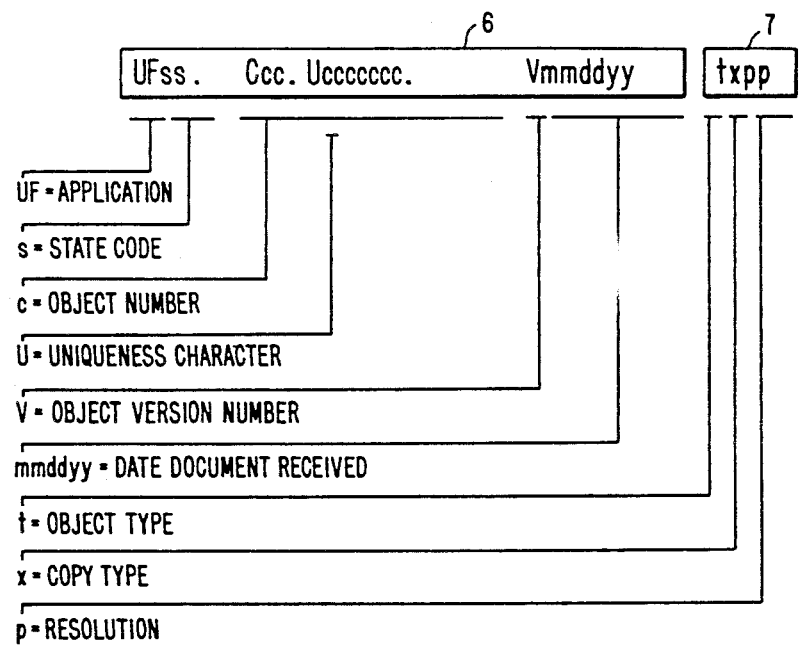

- UF = APPLICATION
- s = STATE CODE
- c = OBJECT NUMBER
- U = UNIQUENESS CHARACTER
- V = OBJECT VERSION NUMBER
- mmddyy = DATE DOCUMENT RECEIVED
- t = OBJECT TYPE
- x = COPY TYPE
- p = RESOLUTION

FIG. 11.

| MANAGEMENT CLASS NAME | MAG30 | OPT6 | MAGONLY | FOREVER | MAG5 |
|---|---|---|---|---|---|
| LIFETIME | 7 YEARS | 7 YEARS | 30 DAYS | FOREVER | 5 DAYS |
| BACKUP | YES | YES | NO | YES | NO |
| AUTOEXPIRE | NO | NO | NO | NO | YES |
| OBJECT AGE AT CHANGE FROM MAGNETIC DISK DASD TO ACTIVE OPTICAL STORAGE | 30 DAYS | N.A. | LIFETIME | LIFETIME | LIFETIME |
| OBJECT AGE AT CHANGE FROM ACTIVE OPTICAL STORAGE TO OPTICAL SHELF | 6 MONTHS | 6 MONTHS | N.A. | N.A. | N.A. |
| OBJECT AGE AT DELETION FROM OPTICAL SHELF | LIFETIME | LIFETIME | N.A. | N.A. | N.A. |

FIG. 12B.

S1 – DOCUMENT ARRIVES AT MAILROOM.
S2 – REQUEST SENT FROM WS DATA TERMINAL TO FMS FOR TEMPORARY OBJECT ID.
S3 – TEMP. ID. RETURNED; POSTED ON DOCUMENT.
S4 – FMS GENERATES AND SENDS TO OMDS ASSOCIATED WITH REQUESTING WS DATA TERMINAL, A PERMANENT OBJECT NAME TO FLAG A STORAGE AUTHORIZATION.
S5 – DOCUMENT MANUALLY TRANSPORTED TO WS DOCUMENT SCANNER.
S6 – TEMPORARY ID. ENTERED AND SENT TO OSDM TO VERIFY CORRECTNESS AND STORAGE AUTHORIZATION.
S7a – IF INVALID TEMPORARY ID, OSDM REPORTS ERROR. JUMP TO S6 OR END.
S7b – IF VALID TEMPORARY ID., OSDM RETURNS VERIFICATION.
S8 – DOCUMENT SCANNED; OBJECT DATA QUALITY VERIFIED; OBJECT DATA SENT TO OSDM.
S9 – OSDM STORES OBJECT DATA USING PERMANENT OBJECT NAME.
S10 – STEPS S6 TO S10 REPEATED IF CAPTURE ALSO TO BE CONDUCTED AT A DIFFERENT RESOLUTION.
S11 – OMDS NOTIFIES FMS THAT OBJECT DATA RECORD HAS BEEN STORED.

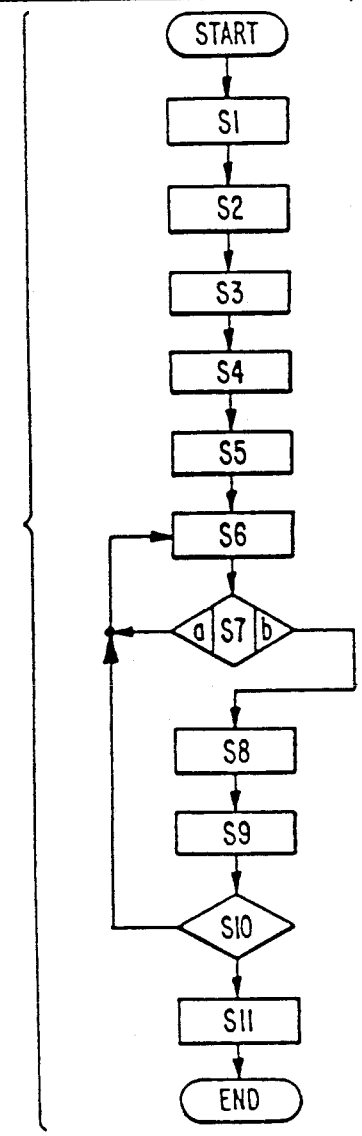

FIG. 13A.

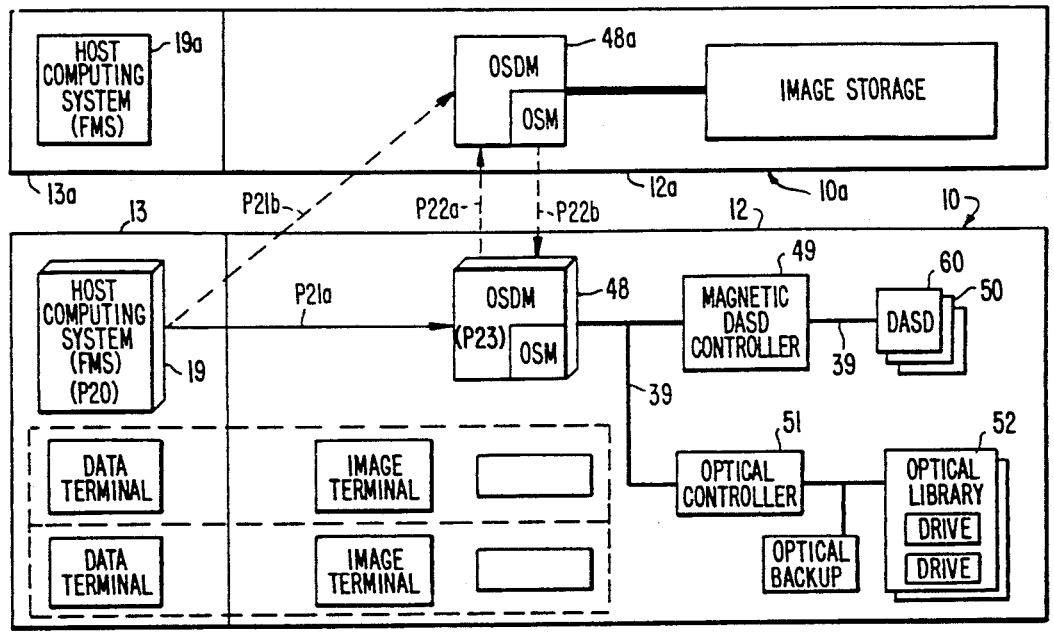

FIG. 13B.

S20 – FMS SELECTS OBJECT FROM WORK QUEUE OR REQUEST MADE FROM A WS DATA TERMINAL

S21 – PREFETCH COMMAND BUILT AND ASYNCHRONOUSLY TRANSFERRED TO OMDS LIKELY TO OWN OBJECT DATA FOR THE DESIRED OBJECT.

S22 – RETRIEVAL COMMAND BUILT; DESIRED OBJECT DATA RETRIEVED; OBJECT DATA TRANSFER TO OMDS ASSOCIATED WITH REQUESTING FMS OR WS DATA TERMINAL. (NOTE: IF A REMOTE OMDS OWNS THE OBJECT DATA FOR THE DESIRED OBJECT, DASHED (---) PROCESSING PATH P22a AND P22b REQUIRED. IF PREFETCH COMMAND INITIALLY TRANSFERRED TO REMOTE OMDS, ONLY DASHED (---) PROCESSING PATHS P21b AND P22b REQUIRED.)

S23 – OSDM ASSOCIATED WITH REQUESTING FMS OR WS DATA TERMINAL STORES TEMPORARY COPY OF OBJECT DATA FOR FUTURE ACCESS.

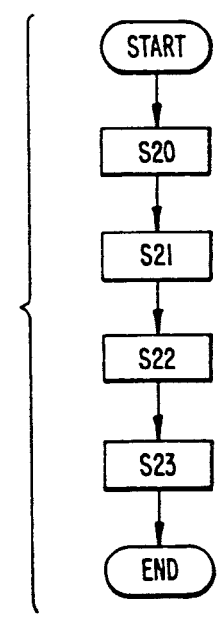

FIG. 14A.

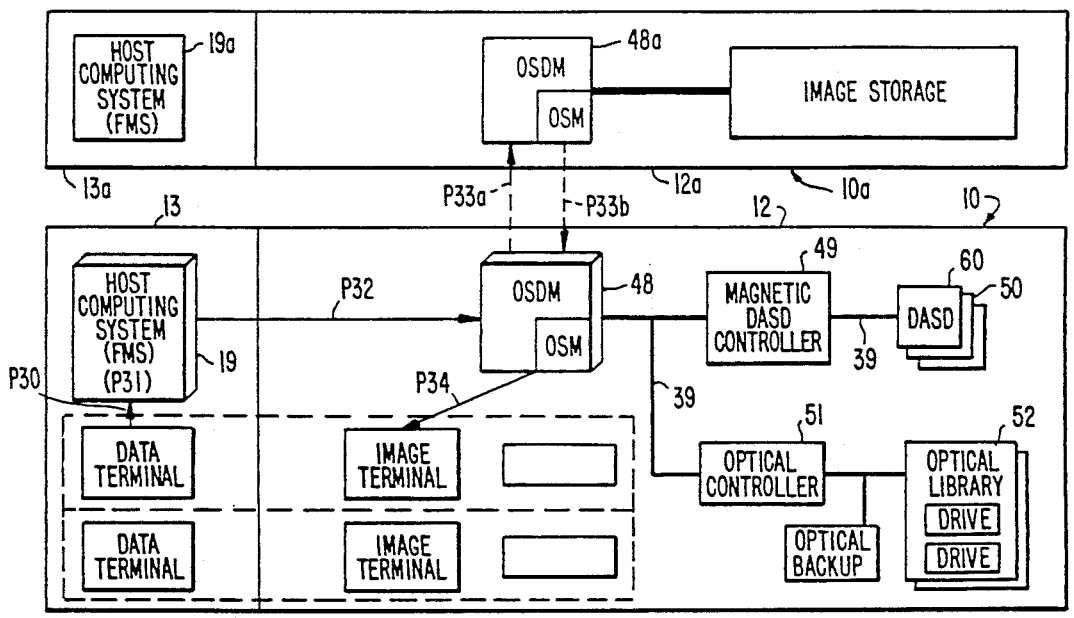

FIG. 14B.

S30 – DISPLAY REQUEST MADE AT WS DATA TERMINAL.
S31 – FMS BUILDS A DISPLAY COMMAND.
S32 – DISPLAY COMMAND TRANSFERRED ASYNCHRONOUSLY TO OMDS ASSOCIATED WITH REQUESTING WS DATA TERMINAL. (NOTE: NO RESPONSE RETURN TO FMS UNLESS AN ERROR IS ENCOUNTERED.)
S33 – RETRIEVAL COMMAND BUILT; DESIRED OBJECT DATA RETRIEVED; OBJECT DATA TRANSFER TO OMDS ASSOCIATED WITH REQUESTING WS DATA TERMINAL. (NOTE: IF A REMOTE OMDS OWNS THE OBJECT DATA FOR THE DESIRED OBJECT, DASHED (---) PROCESSING PATH P33a AND P33b REQUIRED.)
S34 – OBJECT DATA DELIVERED TO THE WS IMAGE TERMINAL FOR DISPLAY.

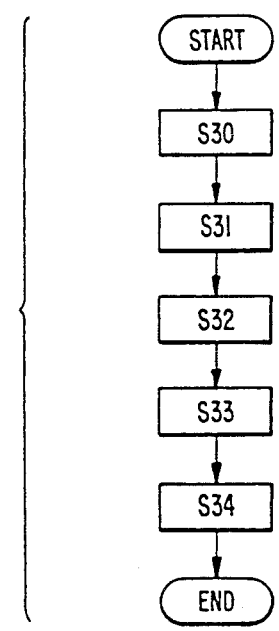

FIG. 15A.

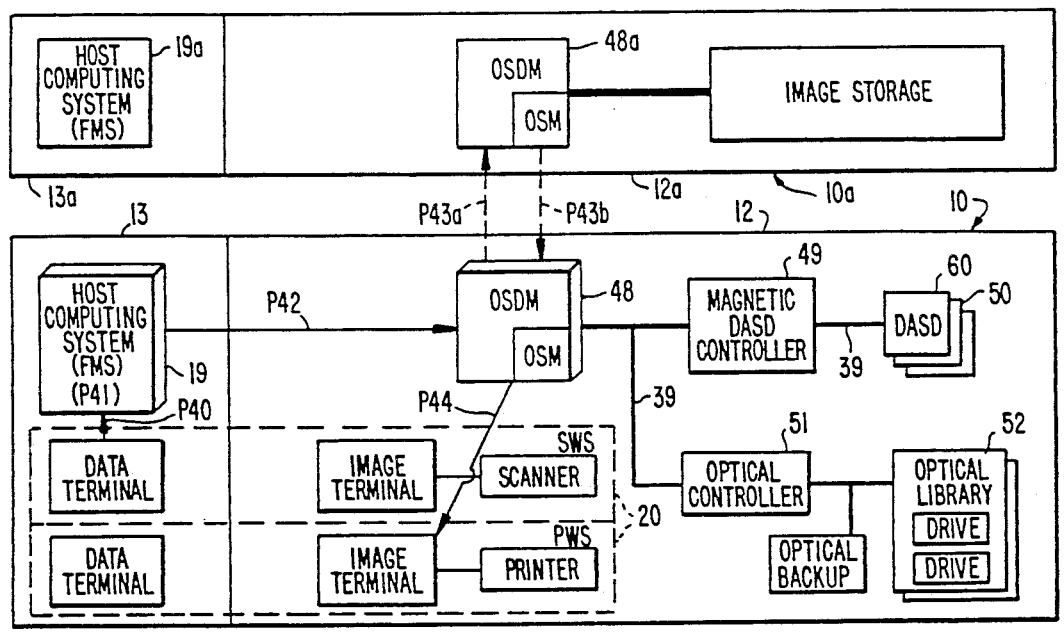

FIG. 15B.

S40 — PRINT REQUEST MADE AT WS DATA TERMINAL.
S41 — FMS BUILDS A PRINT COMMAND.
S42 — PRINT COMMAND TRANSFERRED ASYNCHRONOUSLY TO OMDS ASSOCIATED WITH SUBJECT PRINTER. (NOTE: NO RESPONSE RETURN TO FMS UNLESS AN ERROR IS ENCOUNTERED.)
S43 — RETRIEVAL COMMAND BUILT; DESIRED OBJECT DATA RETRIEVED; OBJECT DATA TRANSFER TO OMDS ASSOCIATED WITH SUBJECT PRINTER. (NOTE: IF A REMOTE OMDS OWNS THE OBJECT DATA FOR THE DESIRED OBJECT, DASHED (---) PROCESSING PATH P43a AND P43b WOULD BE REQUIRED.)
S44 — PRINT COMMAND TRANSFERRED WITH OBJECT DATA THROUGH PWS IMAGE TERMINAL TO PRINTER FOR PRINTING

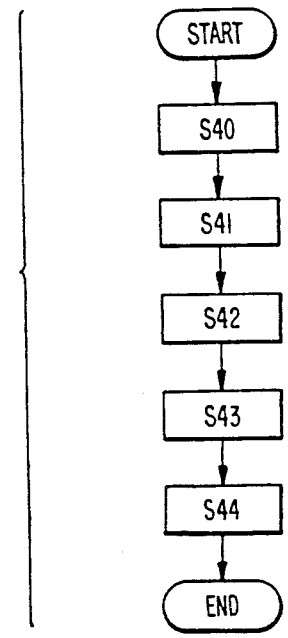

FIG. 16A.

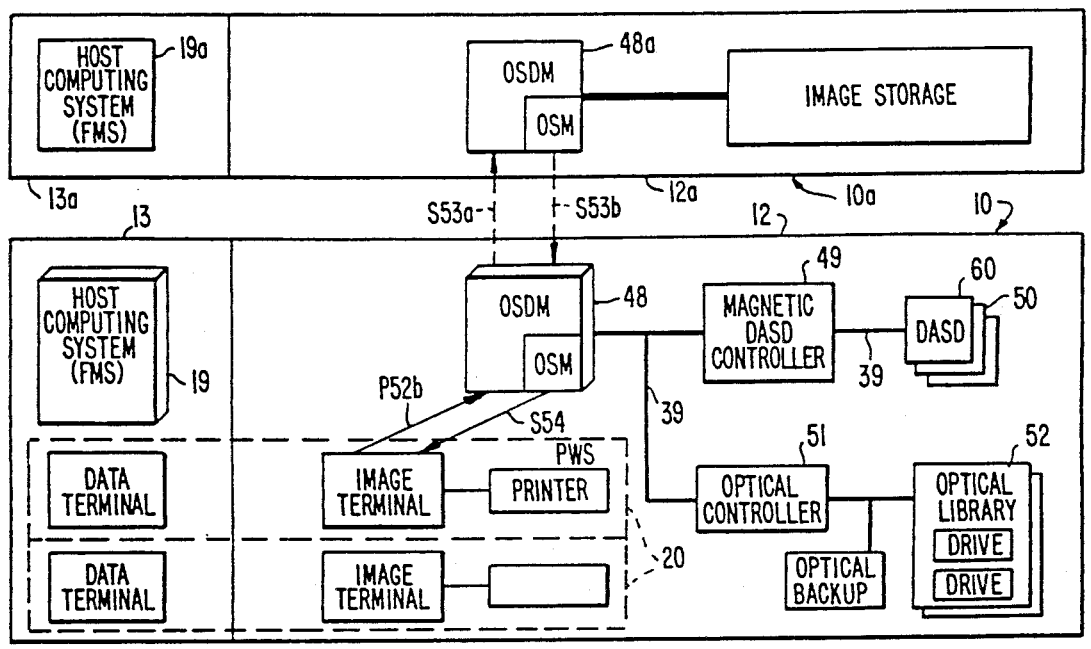

FIG. 16B.

- S50 — PRINT REQUEST MADE AT WS IMAGE TERMINAL.
- S51 — IMAGE TERMINAL BUILDS PRINT COMMAND.
- S52a — IF PWS IMAGE TERMINAL CONTAINS OBJECT DATA RESOLUTION SUFFICIENT FOR PRINTING, PRINT COMMAND AND OBJECT DATA TRANSFERRED TO PWS PRINTER. JUMP TO S55.
- S52b — IF NOT, PRINT COMMAND TRANSFERRED TO OMDS ASSOCIATED WITH SUBJECT PRINTER.
- S53 — RETRIEVAL COMMAND BUILT; DESIRED OBJECT DATA RETRIEVED; OBJECT DATA TRANSFER TO OMDS ASSOCIATED WITH SUBJECT PRINTER. (NOTE: IF A REMOTE OMDS OWNS THE OBJECT DATA FOR THE DESIRED OBJECT, DASHED (---) PROCESSING PATH P53a AND P53b REQUIRED.)
- S54 — PRINT COMMAND TRANSFERRED WITH OBJECT DATA THROUGH PWS IMAGE TERMINAL TO PRINTER FOR PRINTING.
- S55 — PRINT OPERATION ERRORS REPORTED TO IMAGE TERMINAL ORIGINATING THE PRINT REQUEST.

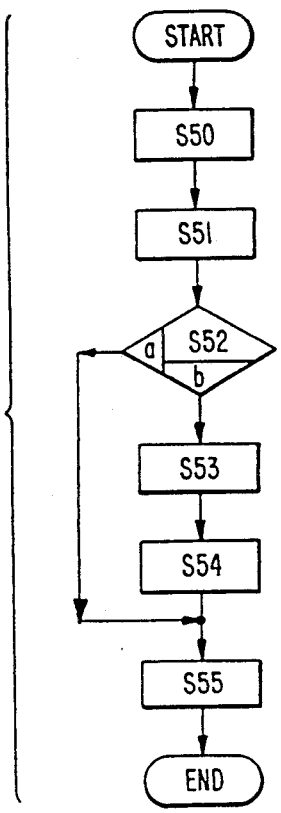

FIG. 17A.

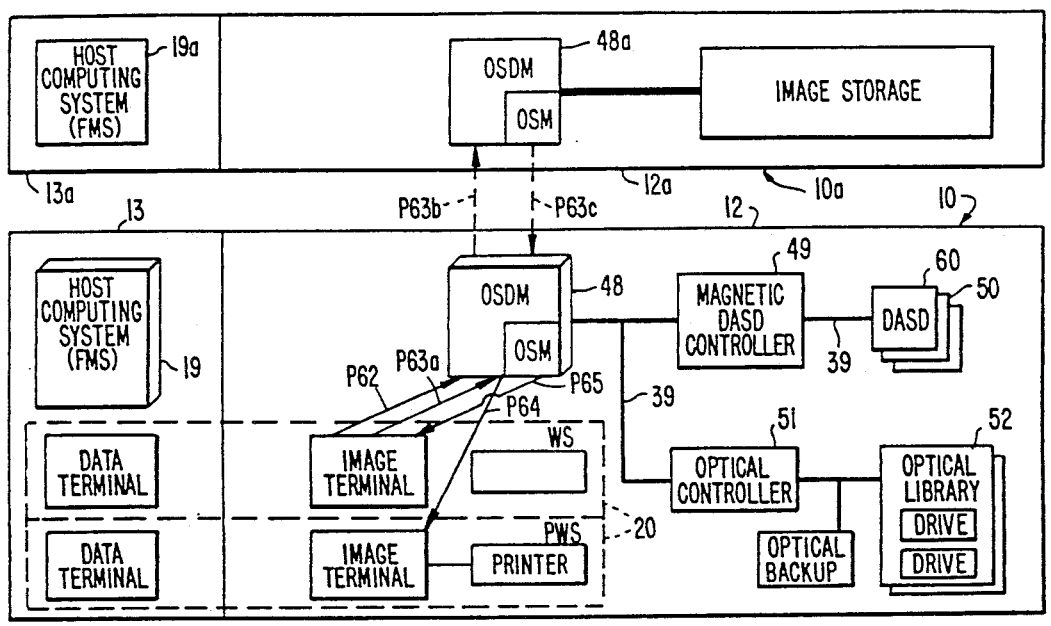

FIG. 17B.

S60 — PRINT REQUEST MADE AT WS IMAGE TERMINAL.
S61 — IMAGE TERMINAL BUILDS PRINT COMMAND.
S62 — PRINT COMMAND TRANSFERRED TO OMDS ASSOCIATED WITH SUBJECT PRINTER.
S63a — IF WS IMAGE TERMINAL CONTAINS OBJECT DATA RESOLUTION SUFFICIENT FOR PRINTING, OBJECT DATA TRANSFERRED TO OMDS ASSOCIATED WITH SUBJECT PRINTER. JUMP TO S64.
S63b — IF NOT, RETRIEVAL COMMAND BUILT; DESIRED OBJECT DATA RETRIEVED; OBJECT DATA TRANSFER TO OMDS ASSOCIATED WITH SUBJECT PRINTER. (NOTE: IF A REMOTE OMDS OWNS THE OBJECT DATA FOR THE DESIRED OBJECT, DASHED (---) PROCESSING PATH P63b AND P63c REQUIRED.)
S64 — PRINT COMMAND TRANSFERRED WITH OBJECT DATA THROUGH PWS IMAGE TERMINAL TO PRINTER FOR PRINTING.
S65 — PRINT OPERATION ERRORS REPORTED TO IMAGE TERMINAL ORIGINATING THE PRINT REQUEST.

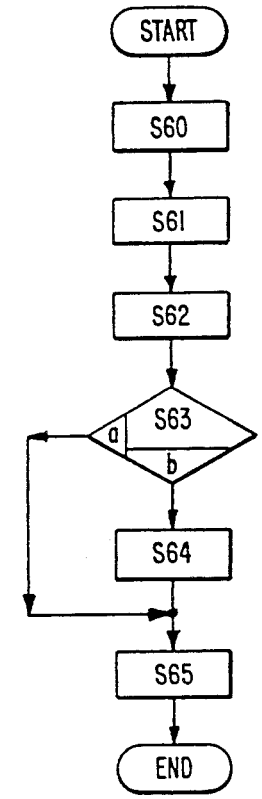

FIG. 18B.

S70 — MODIFY REQUEST AT WS DATA TERMINAL
S71 — FMS BUILDS A MODIFY COMMAND.
S72 — MODIFY COMMAND TRANSFERRED ASYNCHRONOUSLY TO OMDS ASSOCIATED WITH REQUESTING WS DATA TERMINAL. (NOTE: NO RESPONSE RETURN TO FMS UNLESS AN ERROR IS ENCOUNTERED OR STORAGE ACKNOWLEDGMENT MADE.)
S73 — RETRIEVAL COMMAND BUILT; DESIRED OBJECT DATA RETRIEVED; OBJECT DATA TRANSFER TO OMDS ASSOCIATED WITH REQUESTING WS DATA TERMINAL. (NOTE: IF A REMOTE OMDS OWNS OBJECT DATA FOR THE DESIRED OBJECT, DASHED (---) PROCESSING PATH P73a AND P73b REQUIRED.)
S74 — OBJECT DATA TRANSFER TO WS IMAGE TERMINAL.
S75 — MODIFICATION PERFORMED AT WS IMAGE TERMINAL AND TRANSFERRED BACK TO OSDM WITH STORE COMMAND.
S76 — MODIFIED OBJECT DATA STORED.
S77   OSDM SENDS ACKNOWLEDGMENT OF STORE TO WS IMAGE TERMINAL.
S78 — STEPS S74 TO S78 REPEATED IF MODIFY IS TO ALSO BE CONDUCTED AT DIFFERENT RESOLUTION.
S79 — OSDM NOTIFIES FMS THAT MODIFIED OBJECT DATA HAS BEEN STORED.

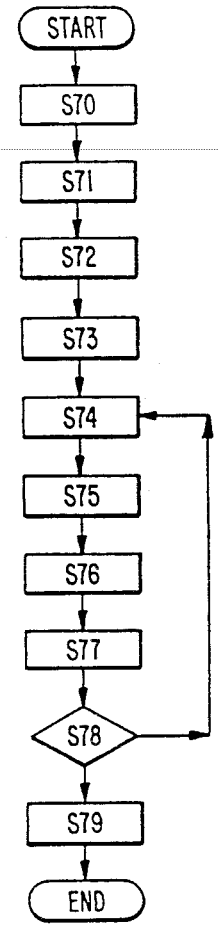

FIG. 19B.

S80 — NEW DOCUMENT PAGES.
S81 — MODIFY REQUEST AT WS DATA TERMINAL SIGNALS NEW OBJECT PAGES TO BE ADDED TO OBJECT RECORD
S82 — TEMP. ID. RETURNED AND POSTED ON PAGES.
S83 — FMS GENERATES AND SENDS TO OMDS ASSOCIATED WITH REQUESTING WS DATA TERMINAL, PERMANENT OBJECT NAME AND TEMP. ID. TO FLAG MODIFY AUTHORIZ.
S84 — TRANSPORT PAGES TO WS DOCUMENT SCANNER.
S85 — TEMPORARY ID. ENTERED AND SENT OSDM.
S86a — IF INVALID ID., ERROR REPORT. JUMP TO S85.
S86b — IF VALID TEMP. ID., OSDM VERIFICATION.
S87 — RETRIEVAL COMMAND BUILT; DESIRED OBJECT DATA RETRIEVED; OBJECT DATA TRANSFER TO OMDS ASSOCIATED WITH REQUESTING WS IMAGE TERMINAL. (NOTE: IF A REMOTE OMDS OWNS OBJECT DATA FOR THE DESIRED OBJECT, DASHED (---) PROCESSING PATH P87a AND P87b REQUIRED.)
S88 — TRANSFER TO WS IMAGE TERMINAL.
S89 — MODIFY BY SCANNING NEW PAGES AT WS IMAGE TERMINAL; TRANSFER BACK TO OSDM WITH STORE COMMAND.
S90 — MODIFIED OBJECT DATA STORED.
S91 — OSDM SENDS ACKNOWLEDGMENT OF STORE TO WS IMAGE TERMINAL.
S92 — STEPS S87 TO S92 REPEATED IF MODIFY ALSO TO BE CONDUCTED AT DIFFERENT RESOLUTION.
S93 — FMS NOTIFIED MODIFIED OBJECT DATA STORED.

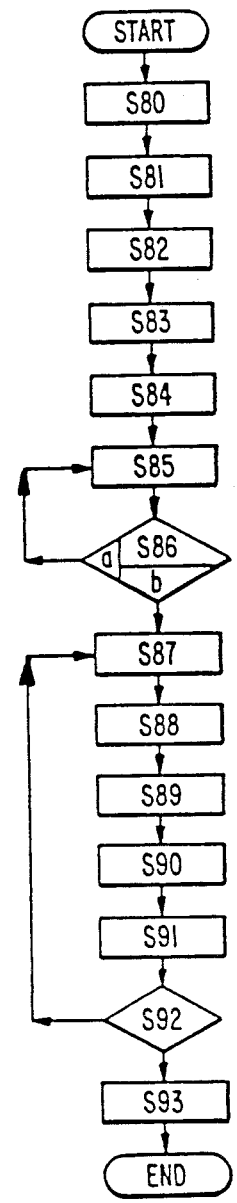

OBJECT MANAGEMENT AND DELIVERY SYSTEM HAVING MULTIPLE OBJECT-RESOLUTION CAPABILITY

DESCRIPTION

1. Field of the Invention

The invention disclosed broadly relates to data processing systems and, more particularly, relates to an object management and delivery system (OMDS) and having multiple object-resolution capability. The disclosed object management and delivery system is particularly suited for use as an image retrieval/storage system.

2. Background of the Invention

Many attempts have been made in the prior art to provide adequate storage for digitized images in data processing systems. Early prior art techniques were based upon the conversion of photographic microfiche records into digitized images which were then stored on either magnetic tape or magnetic disks for later retrieval and display. The problem with the early prior art was that since the digitized image records were quite large, substantial quantities of storage space were required, thus limiting the appeal of such systems for practical applications.

As the prior art evolved, digital image compression algorithms were developed to convert digitized bit patterns for images into a more compressed record which could be more conveniently stored on magnetic tape or magnetic disk devices. However, the size of these compressed records was still large enough to present a problem of adequate storage. In addition, because of the size of the compressed records, access time to retrieve a desired image from the magnetic tape or magnetic disk storage devices was unacceptably long.

There are many known examples of document and/or image storage/retrieval systems: Ganske et al (U.S. Pat. No. 4,139,901) is directed to a document storage and retrieval system including a plurality of remotely disposed control terminals and microfiche carousel document storage files with means for converting microfiche images thereon into video signals representative of the document and for transferring these video signals to a buffer storage unit associated with a requesting control terminal.

Gilbert (U.S. Pat. No. 4,164,024) is directed to an information retrieval system which provides a retrievable updatable display of a permanent microfilm record. An updated display is accomplished by forming a display of a projected permanent microfilm record onto a gas panel display, and supplanting updated portions by blanking or by overwriting predetermined portions of the display with updated information.

Johnson et al (U.S. Pat. No. 4,174,890) is directed to a microfilm utilization device wherein a special bar code is printed along the edge of the microfilm, and wherein an automatic call-up feature can be used so that any given photographic area along a length of the microfilm can be selected in response to the push of a button. Thereafter, any image on the microfilm may be selected for projection by a manual movement in second and third dimensions of a simple lens-positioning mechanism.

Sukonick et al (U.S. Pat. No. 4,197,590) is directed to a computer graphic display system including a random access raster memory for storing data to be displayed. Zoom, pan, split-screen and XOR features can be utilized for the manipulation of a displayed image.

Ovshinsky et al (U.S. Pat. No. 4,205,387) is directed to a data storage and retrieval system wherein miniaturized heating heads are used to produce a selection of sizes of alpha-numeric, pictorial or digital coded images on a heat-responsive recording medium.

Kimoto (U.S. Pat. No. 4,485,454) is directed to an electronic document information filing system in which retrieval data are stored to include a number of codes. Operator keying requirements for the retrieval of documents are minimized because an operator can input desired codes, and the system will then search for and display a number of selectable retrieval data containing the desired codes.

Smutek et al (U.S. Pat. No. 4,553,206) is directed to an image storage and retrieval technique in which digitized information is broken up into blocks of a fixed byte size, and each block stored in memory has a header associated therewith, the header identifying the digitized information, detailing how the image was digitized and compressed, and having an address of any other block containing related information for the same image, thereby to create between blocks a chaining by which all blocks related to an image can be quickly located once a first block is located using an index.

Froessl (U.S. Pat. No. 4,553,261) is directed to a document and data handling system wherein each document is marked with a unique identifier code and then scanned, digitally encoded, and then stored. The system also includes conversion of digitally encoded portions into machine code.

Kato (U.S. Pat. No. 4,574,395) is directed to a picture image filing apparatus which avoids manual input of retrieval data. Retrieval data to be used in retrieving picture image data from an image memory are carried at a predetermined location on an original document itself, and are converted to computer data by the application of a pattern recognition process to digitized data signals from a scanning operation applied to the predetermined location.

Yoneyama et al (U.S. Pat. No. 4,601,003) is directed to a document storage and rearrangement system which gives a user a visual perception of an actual office storage operation. A first picture image pattern provides an operator with a model image representation of a typical office work location, i.e., a desk, filing cabinet, waste basket, etc., and a second picture image pattern presents a visual representation of the document contents of one of the many file folders stored in the system.

Ciampa et al (U.S. Pat. No. 4,635,136) is directed to a method and apparatus for storing a massive inventory of labeled images (e.g., corresponding to real estate parcels), wherein each labeled image is stored on and produced from a different frame of a video disk.

Van Tyne (U.S. Pat. No. 4,672,186) is directed to a digital document scanning system including a scanner which permits the presence or absence of a document to be detected and allows dynamic adjustment of threshold levels, thereby accommodating documents which utilize shaded backgrounds.

Hirose et al (U.S. Pat. No. 4,727,589) is directed to a picture data storage/retrieval system where a plurality of picture data storage/retrieval apparatuses are connected to each other through a communication line, and wherein a given apparatus can request a registration, retrieval or deletion of picture data in a another apparatus.

Berarducci (WO No. 87/04826) is directed to a multiprocessor apparatus having two data busses and being especially suitable for use in processing digital image signals, wherein data can be transferred from a processor to a memory unit while at the same time data are being transferred from a memory unit to a processor.

Morton (WO No. 87/05767) and Morton (WO No. 87/05768) are directed to a digital image communications network having dual communication channels, i.e., a control channel which handles communication data, and an image channel used for the exclusive transmission of images.

The prior art has failed to provide an object management and delivery system (OMDS) which will provide fast access time for either magnetic or optical disk storage, will have a minimized communications traffic on the communications networks used by the object management and retrieval system, and yet will maintain the availability of high resolution images for occasional high resolution requirements when the object management and retrieval system is utilized for image storage/retrieval. Further, the prior art has failed to provide an object management and retrieval system which can perform desired object-related operations with only a modicum of interactions between the operations of a host computing system and said object management and retrieval system.

SUMMARY OF THE INVENTION

It is therefore an object of the invention to provide an improved object management and delivery system which is particularly suited for image storage/retrieval.

It is another object of the invention to provide an improved object management and delivery system which has a fast access time to access stored objects.

A further object of the invention is to provide an improved object management and delivery system which imposes a lower traffic volume on communications systems connected therewith.

Still a further object of the invention is to provide an improved image storage/retrieval system which has a fast access time for stored images, has a reduced impact on the communications traffic, and yet provides for the availability of high resolution images.

A further object of the invention is to provide an improved data processing system wherein an object management and delivery system can perform desired object-related operations with only a modicum of interaction between the operations of a host computing system and said object management and delivery system.

Another object of the invention is to provide an improved data processing system wherein an object management and delivery system can perform object capture, prefetch, display, print and/or modify operations with only a modicum of interaction between the operations of a host computer system and said object management and delivery system.

These and other objects, features and advantages of the invention are accomplished by an object management and delivery system particularly suited as an image storage/retrieval system having the multiple image resolution capability disclosed herein.

A data processing system is disclosed for the storage/retrieval and display of objects and document images, and includes a workstation having a document input scanner coupled thereto for digitizing document images at a first resolution, an image display unit for displaying digitized document images at a second resolution which is less than the first resolution and a printer for printing digitized document images at a third resolution greater than the second resolution, the workstation being coupled to an object storage and delivery manager (OSDM) and storage.

The system includes in the workstation a higher resolution bit plane memory having an input coupled to the document scanner for receiving a digitized document image at the first resolution.

The system further includes a higher resolution image compression unit coupled to the higher resolution bit plane memory and having an output coupled to the image host computer, for compressing an object or the first resolution digitized document image and outputting a first compressed image record to the object storage and delivery manager for storage.

The system further includes a first object storage unit coupled to the object storage and delivery manager for storing compressed records of objects and images digitized at the first resolution, the object storage and delivery manager storing the first compressed image record in the first object storage unit.

The system further includes a resolution modification unit having an input, coupled to the higher resolution bit plane memory, for reducing the resolution of the first resolution digitized object or document image to the second resolution and for outputting a second resolution digitized object or document image.

The system further includes in the workstation a lower resolution bit plane memory having an input coupled to the resolution modification unit for receiving the second resolution digitized object or document image.

Furthermore, the image display unit has an input coupled to the lower resolution bit plane memory for receiving the second resolution digitized image or document image for display.

The system additionally includes a lower resolution image compression unit coupled to the lower resolution bit plane memory and having an output coupled to the image host computer, for compressing the second resolution digitized object or document image and outputting a second compressed image object or record to the object storage and delivery manager for storage, the second compressed image object or record being smaller in size than the first compressed object or image record.

The system further includes a second object storage unit coupled to the object storage and delivery manager for storing compressed records of objects or images digitized at the second resolution, the object storage and delivery manager storing the second compressed object or image record in the second object storage unit.

The system further includes a higher resolution object decompression unit, having an input coupled to the object storage and delivery manager, for receiving and decompressing the first compressed object or image record from the first object storage unit to restore the first resolution digitized object or document image.

The system further includes an object or image scaling unit, having an input coupled to the higher resolution object decompression unit, for converting the first resolution digitized object or document image into a third resolution digitized object or document image having the third resolution.

The system further includes a printer having an input coupled to the image scaling unit, for receiving the third resolution digitized object or document image for printing.

Also included is a lower resolution object decompression unit, having an input coupled to the object storage and deliver manager, for receiving and decompressing the second compressed object or image record from the second object storage unit to restore the second resolution digitized object or document image.

Furthermore, the lower resolution bit plane memory has an input coupled to the lower resolution object decompression unit for receiving the second resolution digitized object or document image for display on the image display unit.

The resulting system reduces communications traffic on the network because of the smaller compressed data records which are transmitted for the low resolution operations. Access time for storing and reading the lower resolution compressed data records is also reduced; however, this lower traffic and faster access time are obtained without sacrificing the availability of high resolution compressed data records which are occasionally needed for printing and other high resolution operations.

Also, the resulting method allows an object delivery and management system to perform object capture, prefetch, display, print and/or modify operations with only a modicum of interactions between the operations of a host computer system and the object management and delivery system.

BRIEF DESCRIPTION OF THE DRAWINGS

The novel features believed characteristic of the invention are set forth in the appended claims. The invention itself, however, as well as a preferred mode, further objects and advantages thereof, will best be understood by reference to the following detailed description of an illustrative embodiment and to the accompanying drawings, wherein:

FIG. 10 is an exemplary object naming convention.

FIG. 11 is an exemplary management class definition table.

FIGS. 12A and 12B are processing and flowchart diagrams, respectively, for a capture operation.

FIGS. 13A and 13B are processing and flowchart diagrams, respectively, for a prefetch operation.

FIGS. 14A and 14B are processing and flowchart diagrams, respectively, for a display operation.

FIGS. 15A and 15B are processing and flowchart diagrams, respectively, for a print operation, as initiated from a host computing data terminal.

FIGS. 16A and 16B are processing and flowchart diagrams, respectively, for a print operation, as initiated from an object terminal.

FIGS. 17A and 17B are processing and flowchart diagrams, respectively, for a print operation, as initiated at an object terminal and printed at a printer work station.

FIGS. 18A and 18B are processing and flowchart diagrams, respectively, for a modify operation which is conducted without additional scanning.

FIGS. 19A and 19B are processing and flowchart diagrams, respectively, for a modify operation which is conducted with additional scanning.

DETAILED DESCRIPTION OF A PREFERRED EMBODIMENT

Figure 1:
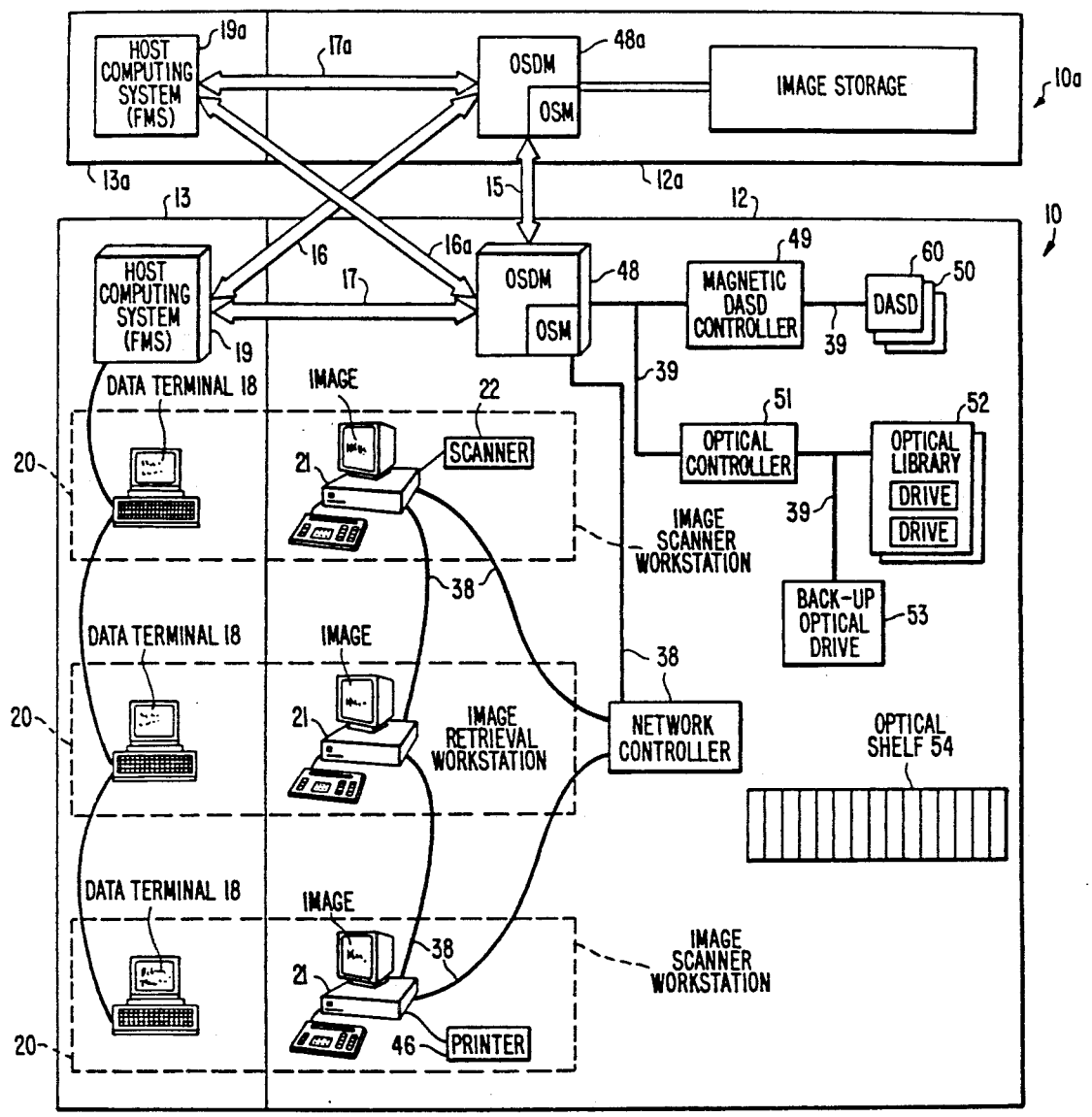
FIG. 1 is a block diagram illustrating local and remote data processing systems each comprising an object management and delivery system associated with a host computing system.

The invention relates an object management and delivery system having multiple object-resolution capability.

In order to increase the clarity and understanding of the description of the invention, the following definitions are adopted for the purposes of the application:

An "object" is defined as any stream of data bits.

Digitized data, which are derived from signals resulting from, and related to, objects and which may be utilized in reproduction of the objects, are referred to as "object data". This object data may be stored or transmitted using magnetic, electronic or optical techniques and, further, transmission may be conducted in the digital or analog form.

Object data related to a single or multi-page document will be referred to as a "record".

Whenever possible, corresponding reference numerals will be used for corresponding components throughout the several drawing figures.

Further, throughout the discussions to follow, several computer commands are revealed as having been constructed and transmitted. These commands will be only generally discussed since, as will be appreciated by one skilled in the computer art, the exact construction of a computer command is highly dependent upon hardware and software chosen to implement the disclosed host computing system and the object management and delivery system.

The term "object" was purposely given a comprehensive definition so as not to limit the scope of the invention. The inventive object management and delivery system is particularly suited for use as an image storage/retrieval system wherein object data are more specifically "image data" which are derived from signals resulting from, and related to, electronic scanning of documents, and which may be utilized in reproduction of images representative of the documents. The following discussions occasionally characterize the invention as an image storage/retrieval system, as such a characterization is the most convenient form for explanation and may prove helpful in developing a clear understanding of the invention.

In many organizations throughout the world, both governmental and private, document handling represents a formidable task in terms of both time requirements and cost. The documents may be of current interest and/or purely of historic interest and the documents may contain information printed or typewritten by machine, printed or written by hand, or pictures, drawings and other forms of representations commonly referred to as "graphics". It is very often necessary to access selected documents for various purposes within a short time from a large volume of documents. Not all of the information contained in the documents may be of importance. In addition, documents may be of greater or lesser degrees of importance, depending upon the type and contents of the documents as well as the nature of the organization.

As one exemplary environment, in applications such as the insurance industry where regional/branch offices for a single insurance company or agency are often located widely about a country, each office has a need for being able to obtain a listing of documentation maintained in a given file associated with a particular customer and to readily examine a copy of any one of the particular documents so listed. In this way, each insurance claims officer can be fully informed of the background situation involved with any transaction or any given claim being handled through his or any other office of the company.

Figure 2:
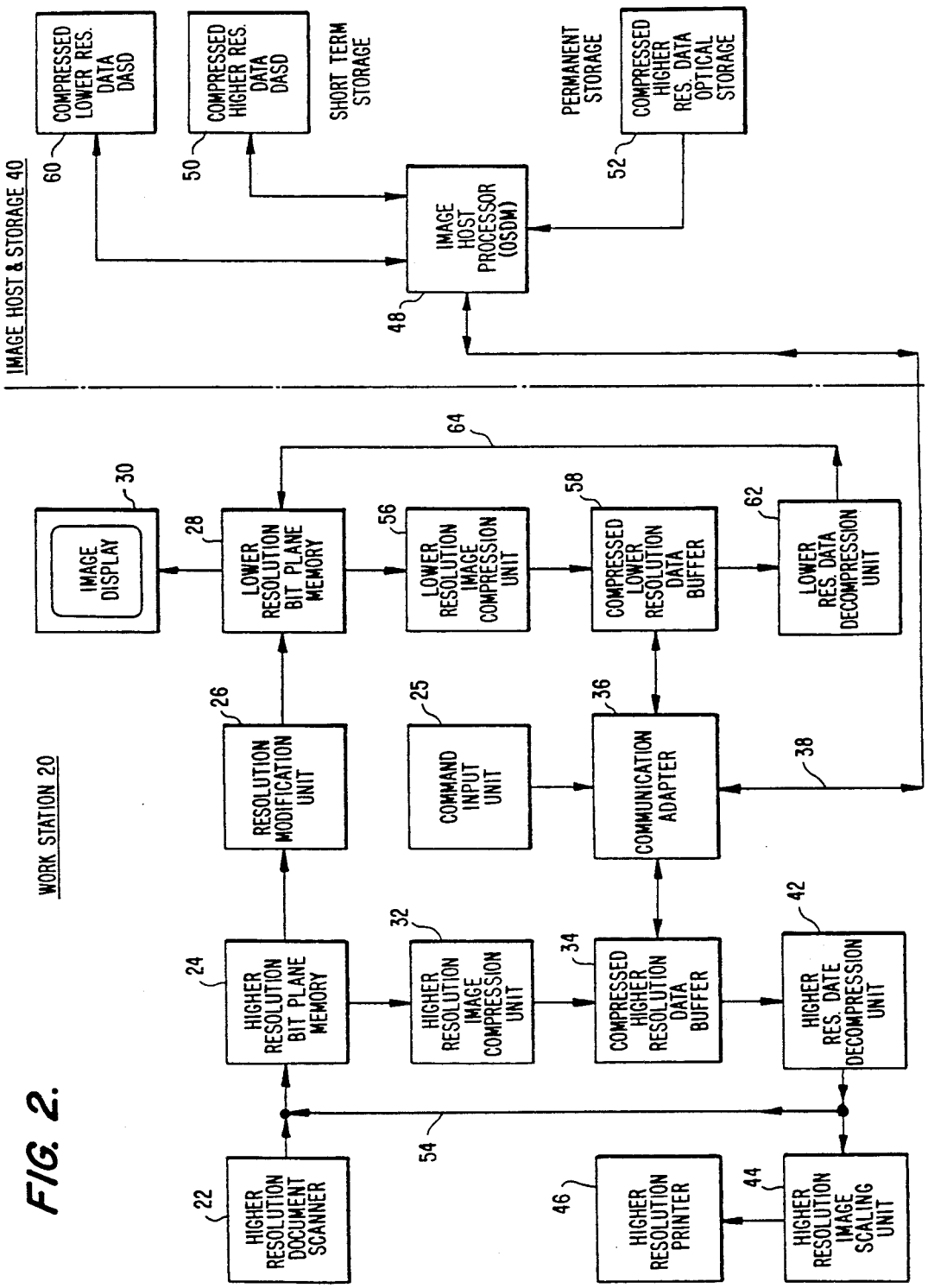
FIG. 2 is an architectural block diagram of the workstation of the dual resolution digital object system.

FIGS. 1 and 2 are architectural diagrams including the dual density digital image system of the present invention.

At an organizational installation depicted generally by reference numeral 10 (FIG. 1), there is an object management and delivery system 12 (hereinafter "OMDS") shown in conjunction with a host computing system 13 (hereinafter "HCS") generally representing a computer operating system operating within the organizational installation 10 independent of the image system 12 (i.e., the installation operating system may represent an operating system in existence before installation of the image system).

The host operating system 13 may include, for example, a file management system 19 (hereinafter "FMS") which is connected to data terminals 18 and which maintains an electronic data base (not shown) having work files containing data pertinent to a particular subject (e.g., an insurance customer file). Due to storage and access time limitations associated with such a system, the data base of the file management system 19 typically contained an index with abbreviated comments as to objects, e.g. hardcopy documents associated with that subject. Without the object management and retrieval system of the present invention, a user would have to manually retrieve or request a stored hardcopy in order to view a representation of a desired document.

Each of the data terminals 18 is part of a workstation 20 which further includes at least an image terminal 21. While in the presently preferred embodiment the data terminal 18 and image terminal 21 for each workstation are provided as discrete devices to segregate the operation of the operating system 13 (i.e., to allow the operating system to operate in the event of an image system failure), an embodiment is also envisioned where the data terminal and image terminal devices for each workstation 20 are incorporated into a single device.

Each of the image terminals 21 is connected to a communication network 38 (e.g., a token ring network including a network controller) which is connected to an object storage and delivery manager 48 (hereinafter OSDM).

The OSDM 48 is able to communicate with the file management system 19 regarding document registration, document retrieval and routing requests (all to be described below), and in response thereto is able to retrieve object data stored in an object storage and to provide this object data to one or more of the image terminals 21 through the communication network 38. In order to conduct object storage and retrieval tasks, the OSDM comprises an object storage manager (OSM). The object storage comprises, for example, a magnetic disk DASD (Data Acquisition and Storage Device) 50, 60, magnetic DASD controller 49, optical library 52, back-up optical drive 53 and optical controller 51 all connected via network 39.

The hardware and software of the OMDS 12 and operating system 13 at a given installation may be close together (e.g., in the same room) or widely disbursed (e.g., on different floors) as long as the important communication link 17 between the two is maintained. Further, while the organizational installation 10, including the OMDS 12 and operating system 13, may be in a first city (e.g., Washington, D.C.), installation 10a (FIG. 1) is an example of a installation which can be located quite a distance away from the first installation, e.g., in Los Angeles. Further, the invention is not limited and may be applied in multiple concurrent installations, with each installation being able to retrieve object data from any other installation. For sake of simplicity and ease of discussion, only two installations are shown.

As examples of interaction between the two installations, file management system 19 can request object data from OSDM 48a via communications link 16. Likewise, file management processor 19a can request object data from OSDM 48. An important aspect to realize is that, while there can be an exchange of record registration, record retrieval and routing request information between the file management systems and the OSDM, object data are not transferred back to the requesting file management system, but instead must be routed to the requesting installation's local image terminal (e.g., 21) through the OSDM (e.g., 48) which is associated with the requesting installation. Thus, while the file management systems can request object data from a distant image system through the communication links 16 or 16a, the object data must be routed to the OSDM of the requesting installation through the communication link 15.

In addition to the need for file management systems to request object data from remote image systems, frequently an OSDM may require retrieval of object data which it does not own (i.e., data which are not stored in it's associated object store, but are instead stored in the object store of a different image host processor (e.g., 48a)). In such a case, the OSDM is able to use a communication link 15 to request and retrieve needed object data. As the communication exchange is between two OSDMs, such a communication can be coined a "mirror" operation.

FIG. 2. depicts a single workstation 20 (excluding a data terminal) and its connection over a network line 38 to the object host and storage 40. Although there is only a single workstation 20 depicted, it should be apparent from FIG. 1 that there may be many workstations 20 connected in a local area network to a single object host and storage 40 or to a plurality of object hosts and storages 40.

Turning now to a more detailed description of the block diagram of FIGS. 1 and 2, for greater detail on the management of the DASD 50 and 60 and the optical storage 52 by the image host processor 48 please refer to the following copending applications which are hereby incorporated by reference: Ser. No. 190,612, filed May 5, 1988, entitled "Batching Data Objects for Recording on Optical Disks"; Ser. No. 190,739, filed May 5, 1988, entitled "Method of Managing Data in a Data Storage Hierarchy and a Data Storage Hierarchy Therefore"; Ser. No. 190,738, filed May 5, 1988, entitled "A Method of Managing a Media Library"; Ser. No. 190,421, filed May 5, 1988, entitled "A Multi-Level Peripheral Data Storage Hierarchy with Independent Access to All Levels of the Hierarchy"; and Ser. No. 190,422, filed May 5, 1988, entitled "Data Storage Hierarchy and Method for Managing Data Therein".

The currently preferred data processing system shown in FIG. 1 will store and display objects in the following manner. Document input scanner 22 is coupled through an adapter 22' (FIG. 3) to the system bus 37 of the workstation. The document input scanner 22 digitizes document images at a first resolution which, in this example, is a 200 pel per inch resolution. In order to illustrate these image resolutions, an example is given in FIGS. 4 and 5 of how the line A - B is depicted in a high resolution digitization of FIG. 4 and a lower resolution digitization of FIG. 5.

Figure 4:
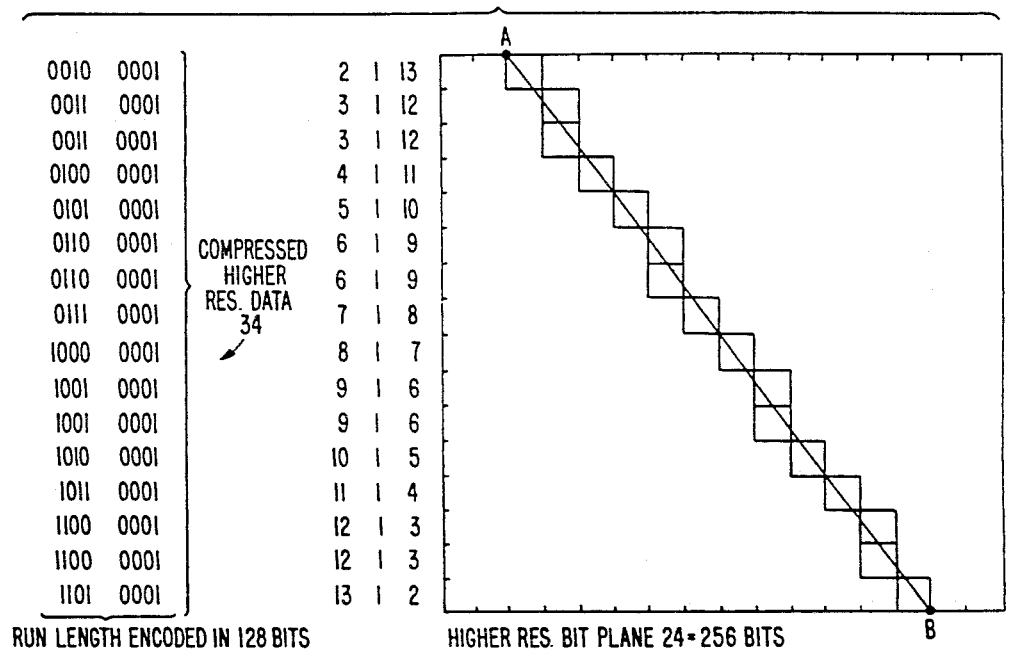
FIG. 4 is a depiction of a higher resolution record including both a higher resolution bit plane and corresponding compressed higher resolution data.

In FIG. 4, the line A - B is digitized into pel elements in a 16×16 matrix resulting in a total of 256 bits for a bit plane representation of the image area.

Figure 5:
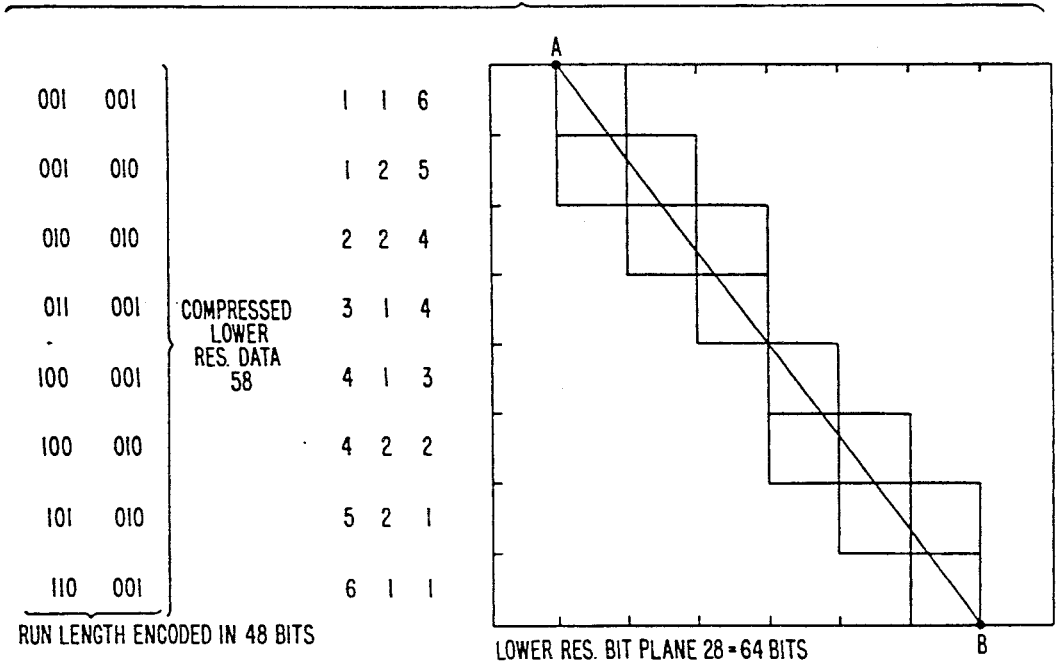
FIG. 5 depicts a lower resolution record including both a lower resolution bit plane and corresponding compressed lower resolution data.

In FIG. 5, the resolution is cut in half so that the image area is divided into an 8×8 matrix, and 64 bits are required for the bit plane representing the image area.

Image display unit 30 is coupled to the workstation for displaying a digitized object or document image at the second lower resolution which in this example is 100 pels and is illustrated by the lower resolution image in FIG. 5.

In addition to the first high resolution and second lower resolution digitization discussed above, in a presently preferred embodiment, printer 46 is coupled to the workstation for printing digitized objects and document images at a third resolution of 300 pels per inch. This resolution is greater than the input resolution from the document scanner 22, which is 200 pels per inch. As will be appreciated by one skilled in the art, the 300 pel per inch printing resolution has been adopted to advantageously render the preferred embodiment consistent with current printing standards. The processing and adaptation of originally scanned 200 pel per inch object or image data into 300 pel per inch data for printing are well known in the art and are not the subject of the invention.

The workstation image terminal is coupled over a communication adapter 36 (FIG. 2 or 3) and the network line 38 to the object host and storage 40. The communication adapter 36 may be, for example, an IBM token ring adapter.

Looking at the workstation 20 in more detail, a higher resolution bit plane memory 24 has its input coupled to the document scanner 22 for receiving a digitized document image at the first, higher resolution of 200 pels, such as that represented in FIG. 4. In the hardware depiction of the workstation in FIG. 3, the system memory 41 for the workstation 20 can be envisioned as being partitioned into several instruction code regions and several storage or buffer regions. One of the storage regions in memory 41 is set aside for the high resolution bit plane 24. In practice these several instruction code regions and buffer regions may be provided in a single memory means or several memory means.

Also included in the workstation 20 is a higher resolution object compression unit 32 having an input coupled to the higher resolution bit plane memory 24 and an output coupled through the compressed higher resolution data buffer 34, and thus this output is available to the communication adapter 36 and the line 38 connected to the object host processor 48 in the object host and storage 40. The compression unit 32 compresses the first or higher resolution digitized object or document image such as that depicted in FIG. 4, and outputs a first compressed object record to the object host computer 48 for storage.

Object or image compression can be performed in a variety of ways which are well known in the art. A simple approach applying run length encoding principles can be explained to compress an exemplary digitized bit plane image. For example in FIG. 4, the line A - B has been digitized in the bit plane 24 into an array of black and white pels, where each white pel is represented by a zero binary value, and each black pel is represented by a one binary value, for a total of 256 bits in the bit plane 24. A simple run length encoding technique always starts with a white pel in a row, and then the number of consecutive white pels along the row is counted. For a 16×16 matrix, there will not be more than sixteen consecutive pels having the same black or white value; therefore, a four-bit representation for each run can be used.

Every time the color of the pel changes from black to white, a next four-bit expression is used to count the number of consecutive next pels of the same color. For example, in the first row of the bit plane 24 of FIG. 4, the first two pels starting at the left side are white; therefore, a first four-bit value of 0010 can be used to run length encode the first two pels. The third pel in the first row is a black pel, and there is only a single black pel. Therefore, the next four-bit expression for the row is 0001, the number of black pels equaling one.

Since there will always be, at most, sixteen pels for a row, the technique for this exemplary run length encoding stops generating four-bit run length coding numbers so that the last consecutive run of like colored pels is not numbered at all, and the difference from the value of sixteen gives the remaining run length and coded value for the final number of pels. In this case, its thirteen white pels complete the first row in FIG. 4. Thus, compressed higher resolution data such as that shown in FIG. 4 are generated by the object compression unit 32 and stored in the buffer 34.

In the object host and storage 40, a first object storage unit 50 is a magnetic disk DASD (Data Acquisition and Storage Device) which is coupled to the image object host processor 48 for storing compressed records of objects or images digitized at the first, high resolution such as that shown in FIG. 4. The object host processor 48 controls the storing of the first, higher resolution compressed image records in the compressed higher resolution data storage 50.

Figure 3:
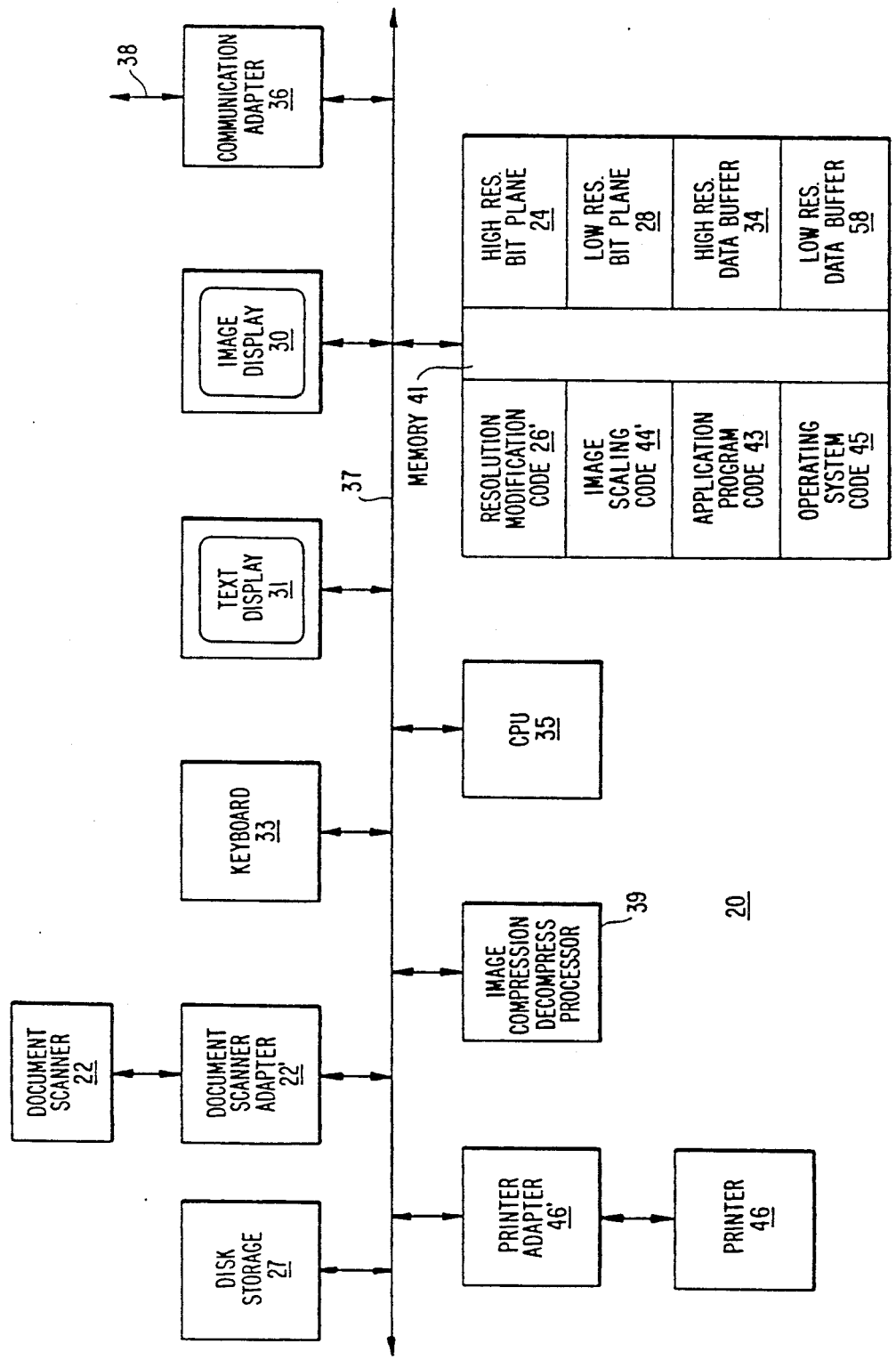
FIG. 3 is a hardware block diagram of the workstation.

Further in the workstation 20, a resolution modification unit 26 has an input coupled to the higher resolution bit plane memory 24, for reducing the resolution of the first digitized object or document image corresponding, for example to that shown in FIG. 4 to a second, lower resolution object or image, such as that shown, for example in FIG. 5. This lower resolution is then outputted as a second resolution digitized document object to the lower resolution bit plane memory 28. As can be seen in FIG. 3, resolution modification unit 26 can be embodied in the memory 41 as a resolution modification code 26' which can be executed by the CPU 35 in the workstation. The resolution modification unit operates to make the transition from a high resolution bit plane representation such as that shown in FIG. 4, to the bit plane representation shown in FIG. 5, by converting from a higher resolution matrix (e.g., a 16×16 matrix) down to a lower resolution matrix (e.g., an 8×8 matrix).

The workstation 20 further includes a lower resolution bit plane memory 28, which has an input coupled to the resolution modification unit 26, for receiving the second, lower resolution digitized object or document image. As is seen in FIG. 3, the lower resolution bit plane 28 can also be embodied as a partitioned portion of the memory 41.

The image display unit 30 has an input, coupled to the lower resolution bit plane memory 28, for receiving the second, lower resolution digitized object or document image for display.

Lower resolution object compression unit 56, has an input coupled to the lower resolution bit plane memory 28, and an output coupled through the compressed lower resolution data buffer 58 to the communication adapter 36 and thus the network line 38 connected to the object host processor 48 of the object host and storage 40. The object compression unit 56 compresses the second, lower resolution digitized object document or image, and outputs a second object record to the object host computer 48 for storage. The second, lower compressed object record is smaller in size than the first, higher compressed object record, as can be seen, for example, in a comparison of FIGS. 4 and 5, where the compressed higher resolution data from the run length encoding operation occupies 128 bits, and the run length encoded version of the compressed lower resolution data occupies 48 bits. In accordance with the invention, whenever a lower resolution image is of sufficient resolution for a given application, it is preferable to access the second, lower resolution compressed object data from the object storage media and to transmit this data over the network since lower resolution object data (having lesser amounts of data than high resolution object data) require less of an access time and impose less of a traffic load on the network.

The object host and storage 40 also includes a second storage unit 60 in the form of a magnetic disk DASD (Data Acquisition and Storage Device) which is coupled to the object host processor 48 for storing compressed records of objects or images digitized at the second, lower resolution corresponding, for example, to FIG. 5. The object host processor 48 controls the storage of the second, lower resolution compressed object records in the second image storage unit 60.

Higher resolution decompression unit 42 has an input coupled from the network line 38 through the communication adapter 36 and the compressed higher resolution data buffer 34, for receiving and decompressing the first higher resolution compressed objects, and for decompressing the first object records from the first object storage device 50, to restore the first, higher resolution digitized object or document image. Referring to FIG. 3, the higher resolution data decompression unit 42 can be embodied as a part of the image compression/decompression processor 39 which is connected over the system bus to the CPU 35 in the workstation 20.

Further, the compression units 32 and 56 and the decompression units 42 and 62 in the workstation 20 can all be embodied in the same image compression/decompression processor 39. An example of such a processor is described in the U.S. Pat. No. 4,610,027, by Anderson, et al., "Method for Converting a Bit Map of an Image to a Run Length or Run End Representation," assigned to the International Business Machines Corporation, and incorporated herein by reference.

It is also possible to have the compression and decompression algorithms, represented by the units 32, 56, 42 and 62, embodied in an executable code which is stored, for example, in the application program 43 in the memory 41 of the workstation 20.

An object scaling unit 44 has an input coupled to the higher resolution object decompression unit 42, and converts the first, higher resolution digitized object into a third resolution digitized document object having a third resolution which, in this example, is 300 pels per inch. This third resolution is adapted for the printer 46 which has an input coupled through the printer adapter 46' to the object scaling unit 44. The printer is capable of printing a high resolution image, and the scaling unit 44 will convert the higher resolution 200 pel image, which has been accessed from the object host and storage 40, into the appropriate resolution for driving the printer 46. Reference to FIG. 2 will show that the object scaling unit 44 can be embodied in an executable code which is the object scaling code 44' stored in the memory 41 and executed by the CPU 35.

The resulting system reduces communications traffic on the network because smaller compressed data records are available for transmission for low resolution operations. Access time for storing and reading lower resolution compressed data records is also reduced; however, because of the image system's concurrent ability also to maintain high resolution object data in the high resolution magnetic disk DASD 50 or the permanent optical storage 52 (discussed ahead), this lower traffic and faster access time are obtained without sacrificing the availability of high resolution compressed data records which are occasionally needed for the high resolution printer and other high resolution operations.

Magnetic disk DASD storage 50 and 60 represents a preferable storage facility where a lower resolution record is being maintained, or, where a record is "active" in the sense that the record has recently been entered into the OMDS and/or the record is one which will likely be requested or modified soon. However, magnetic disk DASD storage is typically limited in terms of storage space.

For more permanent image data storage, a third object storage unit 52 can be included which, for example, can be a high capacity optical storage device suitable for the permanent storage of digitized objects. The third image storage device 52 is coupled to the object host processor 48 and stores compressed records of object digitized at the first, higher resolution.

As records become less active and of less interest, the presently preferred embodiment contemplates a transfer of these records to storage in the permanent third object storage device 52. The storage operation for a transfer from active to permanent storage is illustrated by the flow diagram of FIG. 6.

The host processor 48 will transfer the first, higher resolution compressed records from the first storage DASD 50 to the third optical storage device 52 after a predetermined aging period, for example, 30 days. This aging period enables systems' operators to have current digital object records on hand on the DASD storage device 50 over a predetermined interval of time, such as 30 days, during which operations with the stored objects will usually be completed. During the predetermined period, the object host computer 48, in response to requests from the command input unit 25 at a workstation 20, will selectively access a first, high resolution compressed object record from the first storage DASD 50. However, after the expiration of the predetermined period, in this example, 30 days, the object host processor 48 will selectively access the first high resolution compressed image record from the third storage, or the optical storage device 52. The host processor 48 will be able to determine an elapsed period associated with an object by deriving this information from chronological digits of a permanent object name (discussed ahead) associated with the record.

The host processor 48 will discard the second, lower resolution compressed object records, such as the exemplary record shown in FIG. 5, from the second storage DASD 60 after the expiration of the predetermined period (e.g., 30 days). Thereafter, if a request is made at the command input unit 25 to retrieve a copy of a digitized object for display on the display device 30, the following operations would be followed.

Since the lower resolution (e.g., the 100 pel per inch) is no longer stored in the object host and storage 40, the host processor 48 will access higher resolution (e.g., the 200 pel per inch) object data record of the digitized object from the permanent optical storage 52. The compressed high resolution record will be decompressed in the high resolution data decompression unit 42 of the workstation 20. The resulting digitized high resolution object will be directed over line 54 to the higher resolution bit plane memory 24 where it will be applied to the resolution modification unit 26, thereby resulting in a lower resolution object which is applied to the lower resolution bit plane memory 28 for application to the image display 30. This operation is depicted in the flow diagram of FIG. 7 for the display operation. The dual density capability of the image retrieval/storage system is further explained in co-pending application "Dual Density Digital Image System".

In prior art systems, the operations of a host computing system and an image system are typically integrated such that a critical breakdown in the operation of the image system also results in a disadvantageous breakdown of the host computing system.

An important feature to note is that the invention has produced a method which allows an object management and delivery (OMDS) system to perform desired object-related requests with only a modicum of interaction between the operations of a host computing system (e.g., the previously discussed file management system) and the OMDS. For the purposes of this application, the term "modicum of interaction" is defined as a small or moderate amount of interaction. Several interactions have been previously mentioned. A non-exhaustive list of typical interactions include: object-related requests transferred from the FMS to the OMDS; object registration data transferred from the OMDS to notify the FMS that an object record has been stored; and/or error data transferred from the OMDS to notify the FMS when the OMDS encounters and error in trying to perform an object operation request by the FMS.

The substantially discrete operation of the inventive OMDS will be more fully appreciated after a discussion of the several object-related operations discussed below with reference to FIGS. 6–19.

Throughout these figures and the discussion to follow, method steps will be associated with reference numerals beginning with an "S", and processing paths or locations will be associated with reference numerals beginning with a "P". Whenever possible, a processing path or location resulting from and corresponding to a particular method step will be assigned the same numerical trailer, e.g., "S101" and "P101".

Figure 12A:
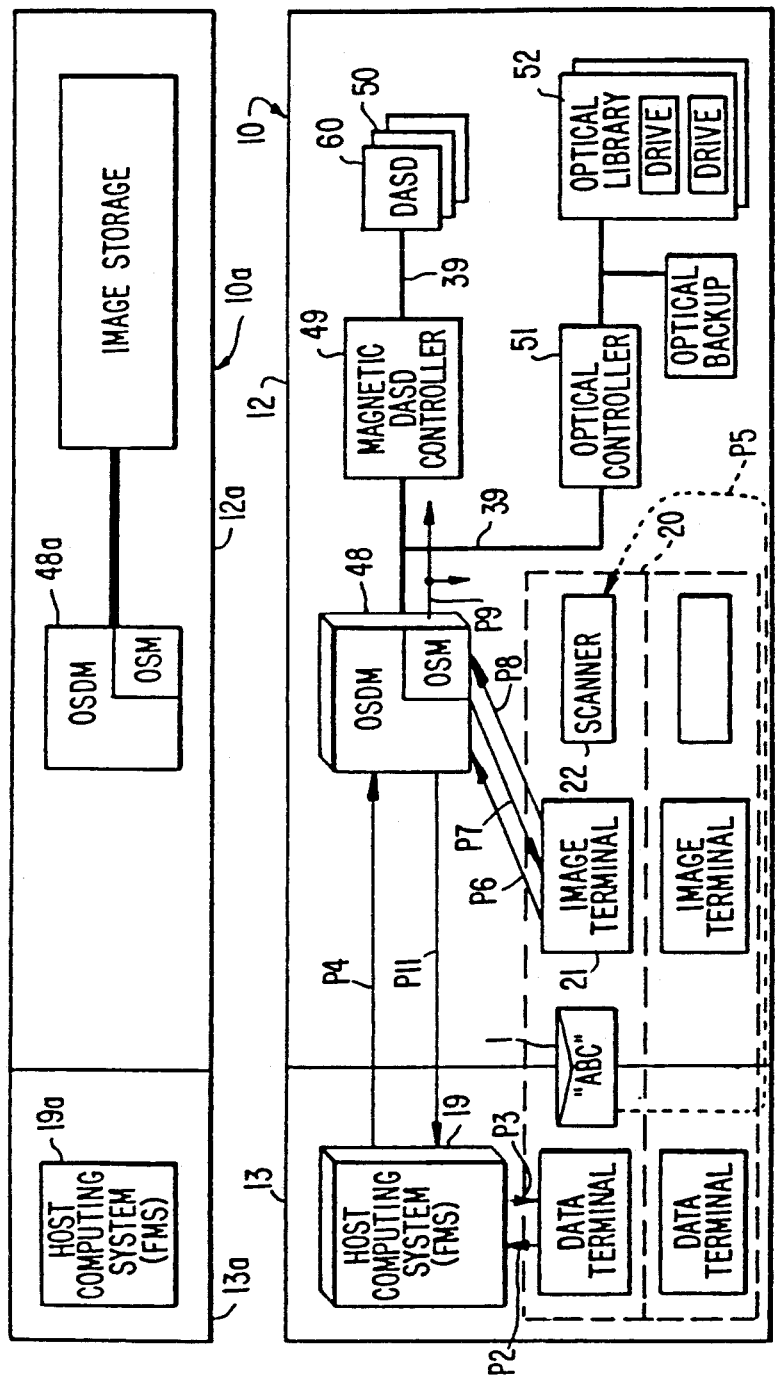

A "capture" operation will be described with initial reference to FIGS. 12A an 12B.

At a step S1, a single or multi-page document 1 arrives at the organizational installation, e.g., at a mailroom. In step S2, a request is sent from a workstation (hereinafter "WS") data terminal to the file management system (hereinafter "FMS") via processing path P2 for a temporary document ID. A temporary document ID can be any type of ID number (e.g., "ABC" or any other randomly generated number), as long as a different temporary document ID is assigned upon each request to distinguish different respective documents. In step S3, a temporary document ID is assigned by the FMS and returned via processing path P3 and is posted (e.g., via manual handwriting or machine printing) on the document 1. The temporary document ID may be posted on a non-important area (e.g., on a back-side), of the document, on simply the first page or, for extra safety, on each page of the document.

In a step S4, the FMS generates and sends to the OMDS associated with the requesting WS data terminal, a permanent document name coordinated with the name with the temporary document I.D. currently associated with the document. The receipt and storage of the permanent document name in the OMDS act as an authorization to allow input scanning of a document having associated temporary document ID.

A presently preferred object-naming convention is illustrated in FIG. 10.

A first name portion 6 generated by the FMS comprises: application digits "UF" specifying an application (e.g., insurance division, parking ticket division, etc.) to which the object is relevant; state code "ss" specifying a geographical or other location data; object number "Ccc.Uccccccc" including a uniqueness number "U"; object version number "V" which would typically be some default value (e.g., "∅" unless a later version of an object is created later in same day) and chronologic digits "mmddyy" specifying the date the object was received.

In step S5, the document 1 is manually transported as indicated by processing path P5 to a WS document scanner station. It should be noted that this transport operation may occur over a substantial period of time (e.g., hours, days, weeks) and typically will result in the document being transported to a WS document scanner station which is remote from the WS data terminal used to originally request the temporary document ID.

In step S6, the temporary document ID transposed on the document is entered into the image terminal 21 and is sent as indicated by processing path P6 to the OSDM to verify correctness and storage authorization.

In step S7, the OSDM returns an indication represented by processing path P7 of whether or not the temporary document ID entered is invalid or valid. If invalid, the OSDM reports an error and processing jumps to step S6 to allow a user to reenter the temporary document ID. (Alternatively, processing could jump to END.) If valid, the OSDM returns a verification indicating that scanning is authorized for that document.

In step S8, the document is scanned via scanner 22, the image data quality is verified by an operator viewing an image monitor or printout of the document, and the image data is sent to the OSDM.

In step S9, the OSDM stores the object data as a record using the permanent document name. As the record is "active" in the sense that it was recently input into the system and there is a likelihood that the record may be requested or modified, in a preferred embodiment the record would be stored in magnetic DASD 50 or 60 to accommodate prompt retrieval and/or modification.

While a first name portion 6 (discussed above) is generated by the FMS, a second name portion 7 (FIG. 10) is generated by the OSDM. First digital "t" indicates object type, for example, one version of the digit "t" might indicate that the object is of legal significance (e.g., customer correspondence). Second digit "x" indicates copy type, e.g., that scanning was conducted from an original document or a photocopy. Finally, digits "pp" indicate the resolution (e.g., 100 pels per inch or 200 pels per inch) of the object data contained in the record.

In step S10, steps S6 to S10 are repeated if a capture is also to be conducted at a different resolution.

In a normal case, storage for a document in a capture operation is conducted to store both a low resolution (e.g., a 100 pel per inch) record and a high resolution (e.g., a 200 pel per inch) record.

The low resolution record is stored because an object will typically be an active object for a short period of time thereafter (e.g., 30 days), and the low resolution record will represent an alternative where data retrieval and network traffic are minimized. Note that retrieval and transmission of a low resolution record is especially preferred where an object image is to be displayed on the preferred 100 pel per inch image monitor.

The high resolution record is stored to provide sufficient object data which can be used to perform a high-quantity printing reproduction of the original document, and also, for the expected permanent storage of the object record as a high resolution record.

As will be appreciated by one skilled in the computer art, the inventive OMDS can be constructed to allow an operator to override this default situation.

Finally, in step S11, the OMDS notifies the FMS that an object data record associated with that permanent object name has been stored. The FMS can be constructed to thus update a listing of documentation of a subject workfile associated with said object. Operators at workstations 20 would thus be able to access an image reproduction of the object, whether by display on an image monitor or by printing.

An important aspect to note is that there is no object data transfer from the OMDS to the FMS, i.e., communication from the OMDS to the FMS occurs only when the OMDS encounters an error is trying to perform an operation requested by the FMS, or when the OMDS notifies the FMS that an object data record has been stored.

Figure 6:
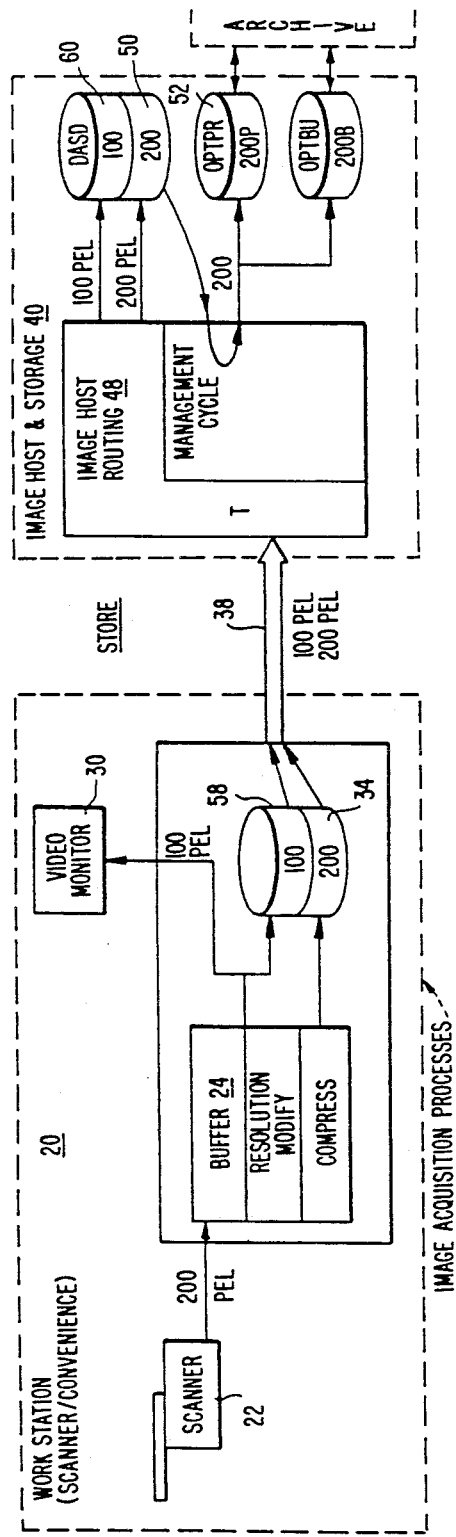
FIG. 6 is an data flow diagram of a store operation for the invention.

FIG. 6 is a data flow diagram showing further details of the capture or store operation.

At this point, it is useful to discuss the storage management of the image system. As discussed previously, the image system 12 comprises an object storage which includes low resolution DASD 60, high resolution DASD 50 and optical storage 52. In performing any record storage or retrieval operation, the IHP could store records at random or at the next sequential storage location and then search the index of each magnetic disk and optical disk to retrieve an object. However, in order to increase operating speed efficiency, the preferred embodiment of the invention makes use of the permanent object name and storage management rules (discussed below) to determine the appropriate (for storage) or likely (for retrieval) place of record storage.

For example, the OMDS can interrogate the state code digits "SS" of the object name (FIG. 10) to determine whether object storage is in the current (i.e., local) object storage or at a remote object storage).

Further, in the OMDS of the preferred embodiment, records are typically maintained in magnetic disk DASD 50 or 60 for a period of at least 30 days. Thus, if an interrogation of the chronological digits "mmddyy" (FIG. 10) of the object name reveals that a period of approximately 30 days or fewer has passed since the object was received, the OMDS can make an assumption and make an initial attempt to retrieve the desired object from magnetic disk DASD. Upon failure of this attempt, the OMDS could then attempt retrieval from optical storage.

If the magnetic disk and optical disk memories are further partitioned and records are stored in these partitions according to object type, copy type and resolution, the "txpp" digits of the record's object name can further be used to increase the operating speed efficiency of storage and retrieval operation.

As mentioned previously, a record may be stored in different storage apparatus during different periods of the record's life. Further, it may be desired to apply different storage rules and life span rules to different types of records.

A "prefetch" operation will be described with initial reference to FIGS. 13A and 13B.

A "prefetch" operation is useful in situations where it is known that a particular record will be requested within a short period of time. As an example of such a situation, an insurance business environment may have a set-up where correspondence inquires are followed up with a bank of telephone operators making telephone solicitations to potential customers. Thus, correspondence inquiries could be scanned and converted into records when received, and the FMS could then maintain a work queue of outstanding inquiries and periodically make a request for a "prefetch" of records pertaining to telephone solicitations which are to be conducted shortly.

In step S20, the FMS selects an object record from the work queue or a request is made from a WS data terminal. In a step S21, a prefetch command is built and transferred to the OMDS likely to own the object data or record for the desired document. (Note that the state code digits "SS" of the document name (FIG. 10) may prove useful in a determination of whether a local or remote storage is suspected.) If the OMDS 12 is determined likely to own the record, the prefetch command is transferred via processing path P21a. In contrast, if a remote OMDS 12a is determined likely to own the record, the prefetch command is transferred via dashed (—) processing path P21b.

In step S22, a retrieval command is built and sent to the appropriate storage facility by the OSDM a copy of the desired object data record is retrieved, and the copy is transferred to the OSDM associated with the requesting FMS or WS data terminal. Note that if a remote OMDS owns the image data record for the desired object, operations utilizing dashed (---) processing paths P22a and P22b would be required. If the prefetch command was initially transferred to the remote OMDS, operations utilizing only dashed (---) processing paths P21b and P22b would be required.

In step S23, the OSDM associated with the requesting FMS or WS data terminal stores a copy of the object data record for the expected future access. The object data record will be stored in the OSDM if it contains sufficient storage facilities. Otherwise, the object data record will be stored in the magnetic disk DASD 50 or 60.

A "display" operation will be described with initial reference to FIGS. 14A and 14B.

In step S30, an object display request is made by an operator at a WS data terminal as indicated by processing path P30. In step S31, the FMS receives the request and (as indicated by the processing operation P31) builds a display command. In order to specify the desired record for display, part of the display command will contain an object name portion 6 such as that illustrated in FIG. 10 In step S32, the FMS display command is asynchronously transferred as indicated by processing path P32 to the OSDM associated with the requesting WS data terminal. An important aspect to note is that no response will be returned from the OSDM to the FMS, i.e., communication from the OSDM to the FMS occurs only when the OSDM encounters an error in trying to perform the display operation requested by the FMS.

In step S33, a retrieval command is built by the OSDM, the desired object data record is retrieved from the appropriate storage apparatus, and the object data record is transferred to the OSDM associated with the requesting WS data terminal. It should be noted that if a remote OMDFS owns the object data record for the desired document, dashed (---) processing paths P33a and P33b would be required.

In step S34, the object data record is transferred as indicated by processing path P34 from the OSDM to the WS image terminal for display.

Figure 7:
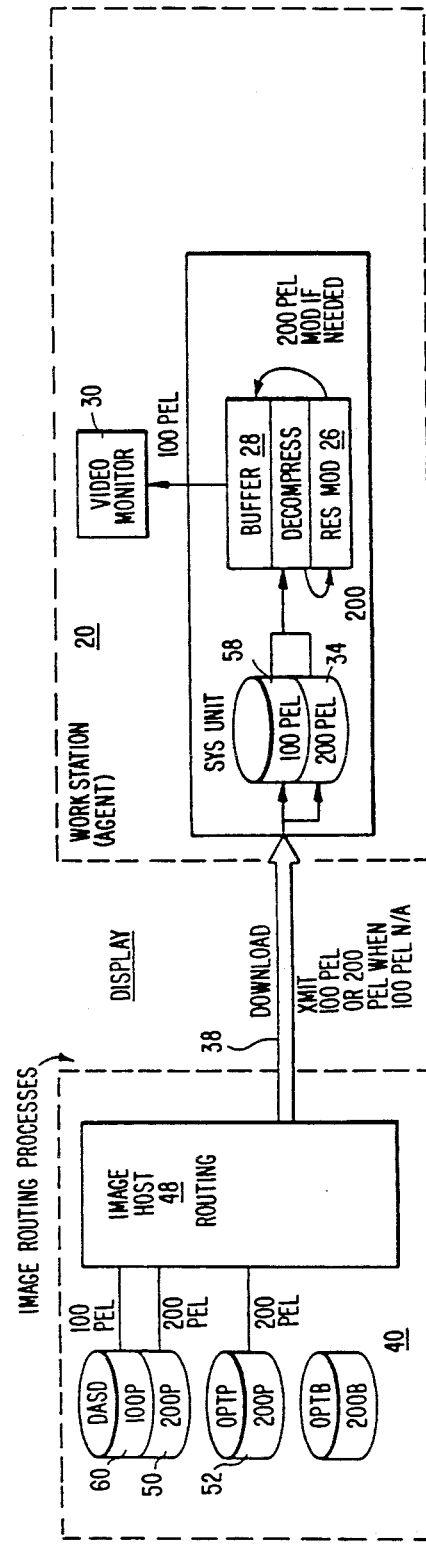
FIG. 7 is an data flow diagram of a display operation for the invention.

FIG. 7 is a data flow diagram showing further details of the display operation.

Several print operations requests are available in the preferred embodiment, i.e., a print operation may be requested by a WS data terminal, a WS image terminal not having a printer apparatus, and a WS image terminal having a printer apparatus. The print operations for each type of request will be separately discussed below.

A "print from data terminal" operation will be described with initial reference to FIGS. 15A and 15B.

In step S40, an object print request is made by an operator at a WS data terminal as indicated by processing path P40. In step S41, the FMS receives the request and (as indicated by the processing operation P41) builds a print command. In order to specify the desired record for display, part of the print command will contain an object name portion 6 such as that indicated in FIG. 10. In step S42, the FMS print command is asynchronously transferred as indicated by processing path P42 to the OSDM associated with the requesting WS data terminal. An important aspect to note is that no response will be returned from the OSDM to the FMS, i.e., communication from the OSDM to the FMS occurs only when the OSDM encounters an error in trying to perform the display operation requested by the FMS.

In step S43, a retrieval command is built by the OSDM, the desired object data record is retrieved from the appropriate storage apparatus, and the object data record is transferred to the IHP associated with the subject printer which is to reproduce the desired object from the object data record. It should be noted that if a remote OMDS owns the object data record for the desired object, dashed (---) processing paths P43a and P43b would be required.

In step S44, a print command is transferred as indicated by processing path P44, with object data through the printer work station (PWS) image terminal to the printer for printing. In a real-world environment, it is often not cost effective to provide each WS with a dedicated printer. Thus, FIG. 15A was purposefully constructed to illustrate that the subject printer might be at a WS which is distant from the requesting WS.

A "print displayed page" operation is used in situations where an operator, viewing an object image at an image monitor PWS, desires to print the displayed page. Reference is made to FIGS. 16A and 16B.

In step S50, a print request is made by an operator at a PWS image terminal whereupon, in a step S51, the PWS image terminal builds a print command.

If the PWS image terminal contains an object data record at a resolution sufficient for printing (i.e., a 200 pel per inch record which can be expanded to a 300 pel per inch record), the print command and object data are transferred to the PWS printer. Processing then continues with step S55.

If the PWS image terminal does not contain an object data record at a resolution sufficient for printing, in step S52b the print command is transferred via processing path P52b to the OSDM associated with the subject printer. In order to specify the desired object for display, part of the print command will contain an object name portion 6 such as that indicated in FIG. 10.

In step S53, a retrieval command is built by the IHP, the desired object data record is retrieved from the appropriate storage apparatus, and the object data record is transferred to the OSDM associated with the subject printer which is to reproduce the desired object from the object data record. It should be noted that, if a remote OMDS owns the object data record for the desired object, dashed (---) processing paths P53a and P53b would be required.

In step S54, a print command is transferred as indicated by processing path P54, with object data through the PWS image terminal to the printer for printing.

Finally, in step S55, any printing errors are reported to the PWS image terminal originating the print request.

As mentioned previously, in a real-world environment, it is often not cost effective to provide each WS with its own dedicated printer. A "print displayed page to printer workstation" operation is used in situations where an operator, viewing an object image at a WS, desires to print the displayed page to a PWS which services the print requests of that WS. Reference is made to FIGS. 17A and 17B.

In step S60, a print request is made by an operator at a WS image terminal whereupon, in a step S61, the WS image terminal builds a print command. In step S62, the print command is transferred as indicated by processing path P62 to the OSDM associated with the subject PWS printer.

If the WS image terminal contains an object data record at a resolution sufficient for printing (i.e., a 200 pel per inch record which can be expanded to a 300 pel per inch record), the object data record is transferred to the OSDM. Processing then jumps to a step S64.

If the WS image terminal does not contain an object data record at a resolution sufficient for printing, in step 63b a retrieval command is built by the OSDM, the desired object data record is retrieved from the appropriate storage apparatus, and the object data record is transferred to the OSDM associated with the subject PWS printer. It should be noted that, if a remote OMDS owns the object data record for the desired object, dashed (---) processing paths P63b and P63c would be required.

In step S64, a print command is transferred, as indicated by processing path P64, with object data through the PWS image terminal to the printer for printing.

Finally, in step S65, any printing errors are reported to the WS image terminal originating the print request.

Figure 9:
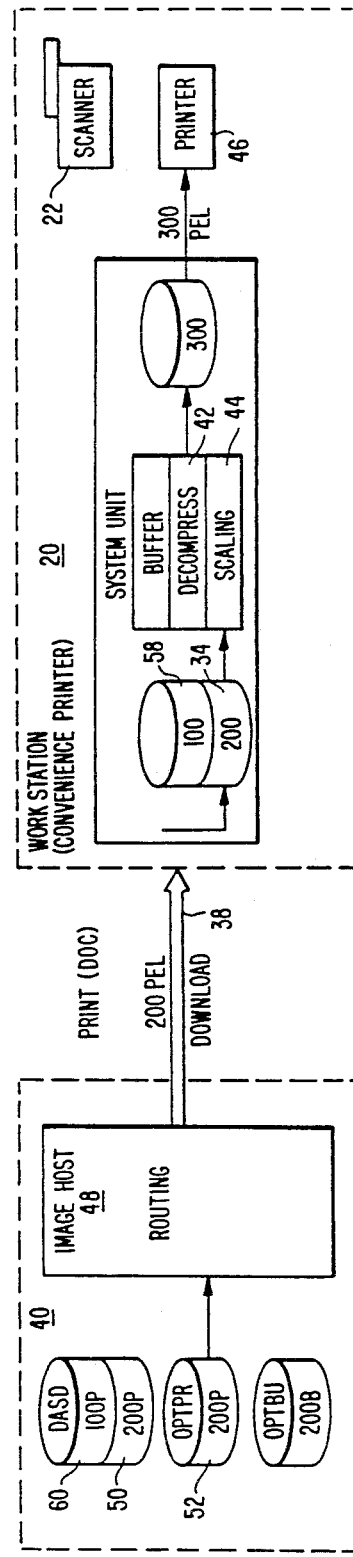
FIG. 9 is an data flow diagram of a print operation for the invention.

FIG. 9 is a data flow diagram showing further details of a print operation.

Several modify operations are available in the preferred embodiment, i.e., a modify operation may be requested to be performed without additional scanning, or to be performed with additional scanning. The operations for each type of modify request will be separately discussed below.

Figure 18A:
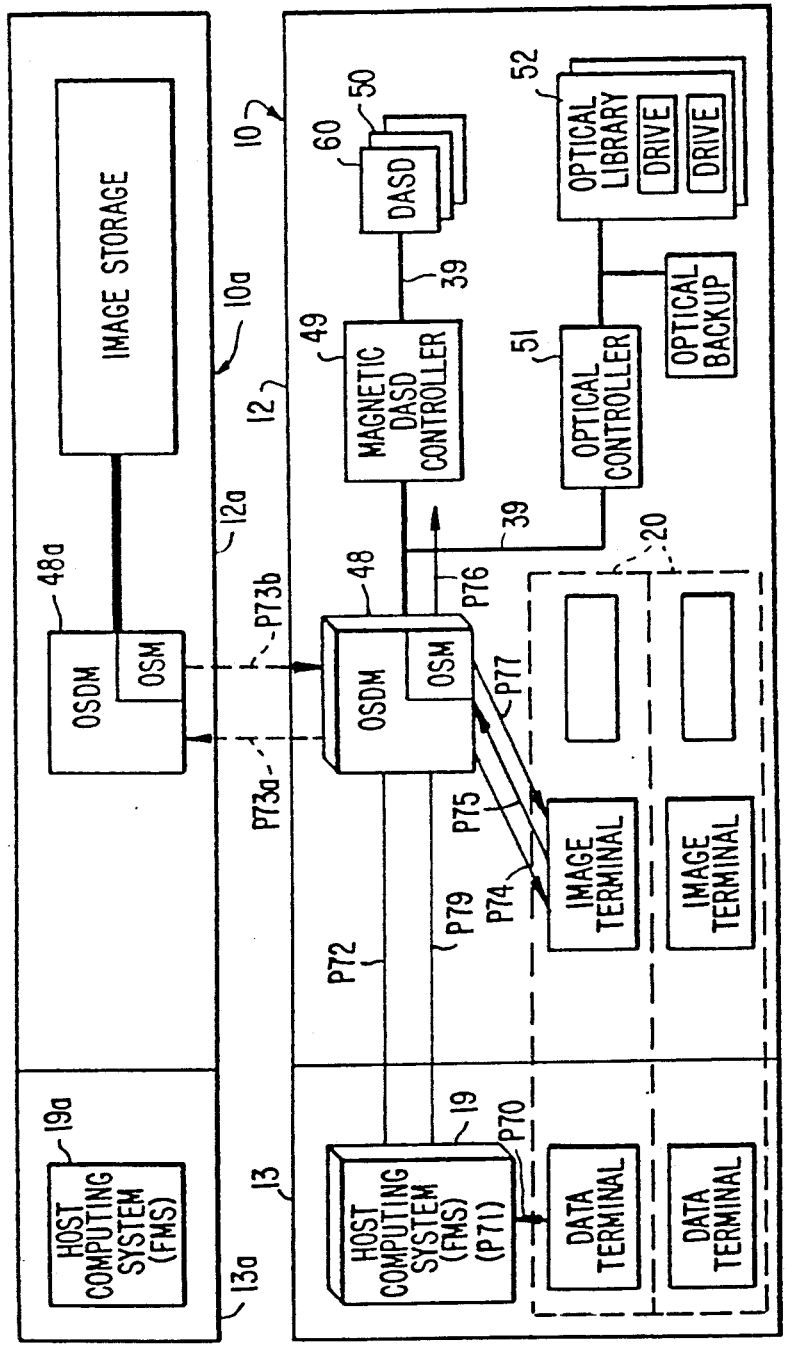

A "modify without scanning" operation is used in situations where, for example, a object must be modified by a deletion of excessive or extraneous pages or materials. Reference is made to FIGS. 18A and 18B.

In step S70, a modify request is made as indicated by processing path P70 by an operator at a WS image terminal, whereupon, in a step S71, the FMS builds a modify command. In order to specify the desired object for modification, part of the modify command will contain an object portion 6 such as indicated in FIG. 10.

In step S72, the FMS modify command is a transferred, as indicated by processing path P72, to the OSDM associated with the requesting WS data terminal. An important aspect to note is that no response will be returned from the OSDM to the FMS, i.e., communication from the OSDM to the FMS occurs only when the OSDM encounters an error in trying to perform the modify operation or when the OSDM sends an acknowledgement that a modified object data record has been stored.

In step S73, a retrieval command is built by the IHP, the desired object data record is retrieved from the appropriate storage apparatus, and the object data record is transferred to the OSDM associated with the requesting WS data terminal. It should be noted that, if a remote OMDS owns the object data record for the desired object, dashed (---) processing paths P73a and P73b would be required.

In step S74, the object data record is transferred, as indicated by processing path P74, from the OSDM to the WS image terminal for modification.

In step S75, the desired modification is performed (e.g., the deletion of extraneous pages) at the WS image terminal and is transferred back to the IHP with a store command, whereupon, in a step S76, the modified object data record is stored. If the object record has been subsequently modified during the same day it was initially entered into the system, or is modified several times in the same day, this will be reflected in the version digit "V" of the object name (See FIG. 10).

In step S77, the OSDM sends acknowledgement of the stored object data record to the WS image terminal. In step S78, steps S74 to S78 are repeated if an object modify operation is to also be conducted at a different resolution, e.g., an operation may have modified a 100 pel per inch record and wish to modify the corresponding 200 pel per inch record.

Finally, at step S79, the OSDM notifies the FMS that a modified object data record has been stored. Operators at workstations would then be able to access a reproduction of the modified object, whether it be by display or an image monitor or by printing.

Figure 19A:
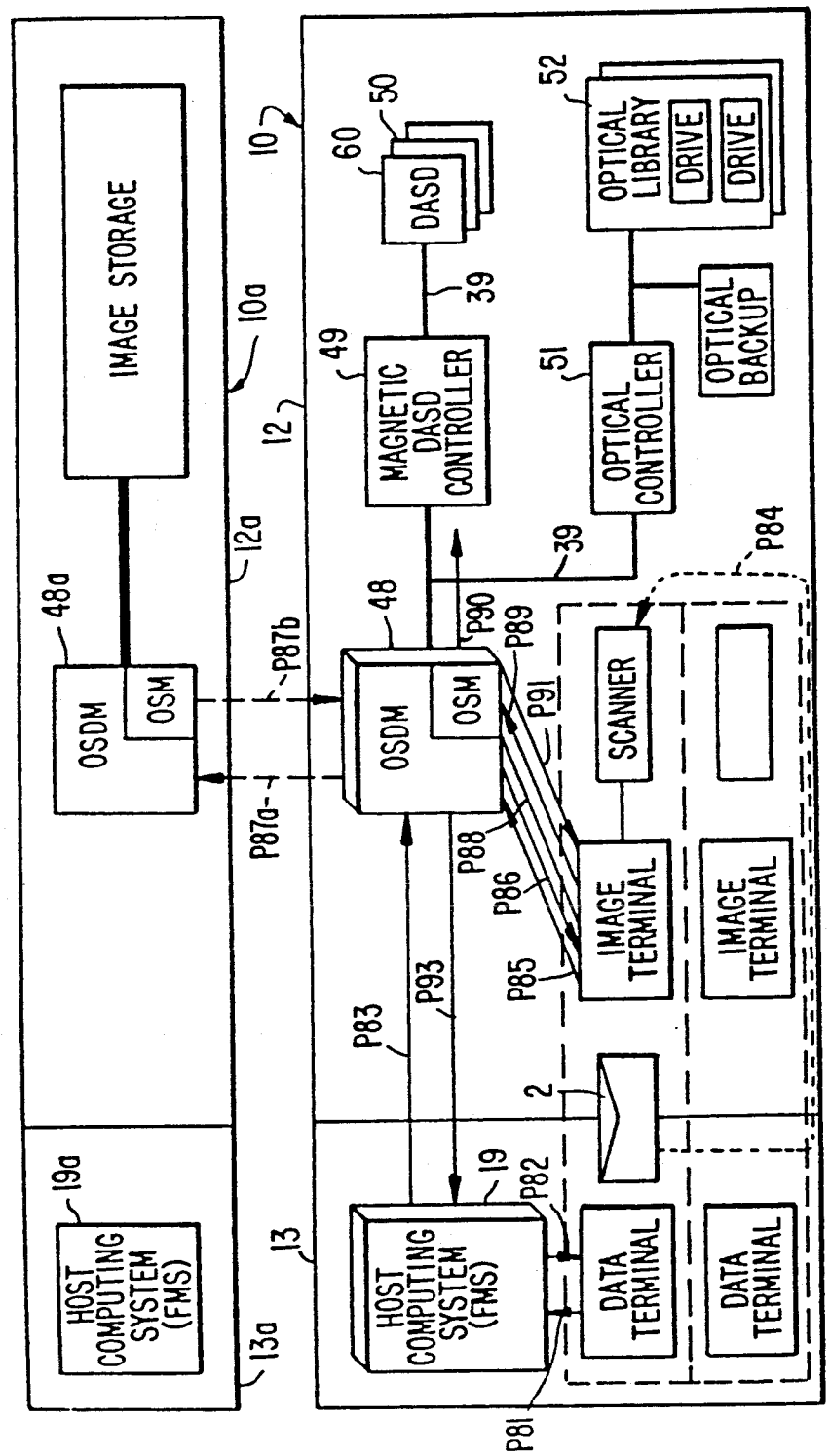

A "modify with scanning" operation is used in situations where, for example, a object must be modified by an addition of new pages or materials. Reference is made to FIGS. 19A and 19B.

In step S80 and S81, a modify request is made as indicated by processing page P81 by an operator at a WS image terminal to signal that new object pages are to be added to an object data record, whereupon, in a step S82 a temporary object ID is returned by the FMS and is posted on the object pages either by manual handwriting or machine printing. In a step S83, the modify command is built by the FMS and the FMS modify command is asynchronously transferred as indicated by processing path P72 to the OSDM associated with the requesting WS data terminal. In order to specify the desired record for modification, part of the modify command will contain an object name portion 6 such as that indicted in FIG. 10. The temporary object ID will also be transferred and associated with the modify command. The storage of the above in the OSDM acts to flag a modification authorization.

An important aspect to note is that no response will be returned from the OSDM to the FMS, i.e., communication from the OSDM to the FMS occurs only when the OSDM encounters an error in trying to perform the modify operation or when the OSDM sends an acknowledgement that a modified object data record has been stored.

In step S84, the new object pages Z are manually transported, as indicated by the processing path P84 to the WS document scanner station. It should be noted that this transport operation may occur over a substantial period of time (e.g., hours, days, weeks) and typically will result in the object being transported to a WS document scanner which is remote from the WS data terminal used to originally request the temporary object ID.

In step S85, the temporary object ID transposed on the new pages is entered into the image terminal and is sent, as indicated by processing path P85, to the OSDM to verify correctness and storage authorization.

In step S86, the OSDM returns an indication represented by processing path P86 of whether or not the temporary object ID entered is invalid or valid. If invalid, the OSDM reports an error and processing jumps to step S85 to allow a user to reenter the temporary object ID. (Alternatively, processing could jump to END.) If valid, the OSDM returns a verification indicating that scanning is authorized for that object.

In step S87, a retrieval command is built by the OSDM, the desired object data record is retrieved from the appropriate storage apparatus, and the object data record is transferred to the OSDM associated with the requesting WS data terminal. It should be noted that, if a remote OMDS owns the object data record for the desired object, dashed (---) processing paths P87a and P87b would be required.

In step S88, the object data record is transferred as indicated by processing path P74, from the OSDM to the WS image terminal for modification.

In step S89, the desired modification is performed by a scanning of the new pages at the WS scanner and is transferred back to the OSDM with a store command, whereupon, in a step S90, the modified object data record is stored. If the object record has been modified subsequently during the same day it was initially entered into the system, or is modified several times in the same day, this will be reflected in the version digit "V" of the object name (See FIG. 10).

In step S91, the OSDM sends acknowledgement of the stored object data record to the WS image terminal. In step S92, steps S87 to S92 are repeated if an object document modify operation is to also be conducted at a different resolution, e.g., an operation may have modified a 100 pel per inch record and wish to modify the corresponding 200 pel per inch record.

Finally, at step S93, the OSDM notifies the FMS that a modified object data record has been stored. Operators at workstations would then be able to access an reproduction of the modified object, whether it be by display on an image monitor or by printing.

An important aspect to note is that the original digitized record representing an object is never deleted from the optical storage unit 52, but there is created a new modified assemblage of digitized images which reflects the modification.

Figure 8:
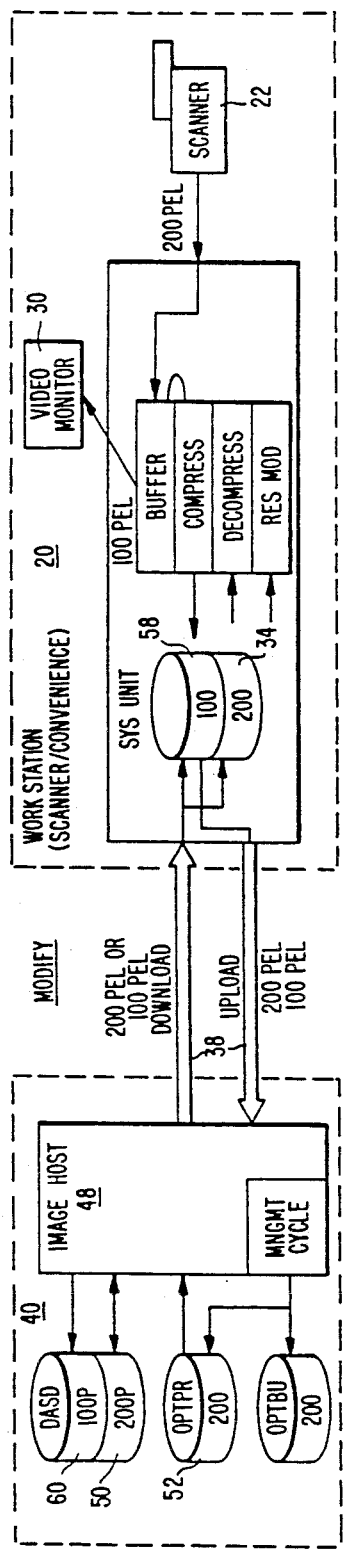
FIG. 8 is an data flow diagram of a modify operation for the invention.

FIG. 8 is a data flow diagram showing further details of a modify operation.

The resulting system reduces communications traffic on the network because of the smaller compressed data records which are transmitted for the low resolution operations. Access times for storing and reading the lower resolution compressed data records are also reduced; however, this lower traffic and faster access time are obtained without sacrificing the availability of high resolution compressed data records which are less frequently needed for printing operations and other high resolution operations.

Although the invention has been described with reference to a specific preferred embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. In a data processing system for storing a plurality of electronic object data records, and displaying and reproducing a desired object using said data records, said data processing system comprising host computing means including data terminal means, and an object management and delivery system having object management means, memory storage means image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a capture operation, and wherein said providing and transferring steps further comprise the steps of:

retrieving temporary object identification characters from said host computing means, and posting said characters onto an object which is to be scanned;

generating a permanent object name in said host computing means and transferring said name together with said temporary object identification characters from said host computing means to said object management and delivery system to flag a capture authorization;

entering temporary object identification characters at image terminal means for an object to be scanned, and sending the entered characters to said object management means to verify storage authorization;

scanning said object with said scanning means, once a storage authorization has been verified, to produce object data corresponding to said object; and sending said object data to said object management and delivery systems and storing said object data in said memory storage means as an object data record, said object data record being associated with said permanent object name.

2. A method as claimed in claim 1, wherein said capture operation is performed for both a low image resolution and a higher image resolution, wherein said scanning step and steps recited thereafter are conducted a first time to produce a low resolution record and a second time to produce a high resolution record.

3. A method as claimed in claim 2 comprising the further step of:

having said object management and delivery system notify said host computing system of said object data record which has been stored.

4. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a prefetch operation, and wherein said providing and transferring steps further comprise the steps of:

obtaining, at said host computing means, a prefetch request indicating a particular object for which an object record is likely to be requested for one of a display, modification, and printing operation;

generating a permanent object name corresponding to said particular object and transferring said name together with a prefetch command from said host computing means to said object management and delivery system; and retrieving an object data record corresponding to said permanent object name and storing said record in said object management and delivery system which is associated with the requesting said host computing means.

5. A method as claimed in claim 4, wherein said record is more specifically stored in said storage memory means of said object management and delivery system which is associated with the requesting said host computing means.

6. A method as claimed in claim 4, wherein said method is applied in an environment where there is a plurality of respective host computing means each associated with a respective object management and delivery system, and wherein, in said generating step, said name and prefetch command are instead transferred from said host computing means to an object management and delivery system likely to own an image data record for said particular document.

7. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a display operation, and wherein said providing and transferring steps are more specifically comprised of the steps of:

entering, at said data terminal means, a display request indicating a particular object to be displayed and sending said request to said host computing means;

generating a permanent object name corresponding to said particular object and transferring said name together with a display command from said host computing means to said object management and delivery system;

retrieving an object data record corresponding to said permanent object name and transferring said record to said object management and delivery system which is associated with said data terminal means which was used to enter said display request; and delivering said object data record and displaying an object image at said image terminal means which is associated with said data terminal means which was used to enter said display request.

8. A method as claimed in claim 7, wherein said method is applied in an environment where there is a plurality of respective host computing means each associated with a respective object management and delivery system, wherein, if a desired object data record is stored in a remote object management and delivery system which is not associated with the requesting said data terminal means, a data retrieving operation of said retrieving step is conducted with respect to said remote object management and delivery system.

9. A method as claimed in claim 7, wherein said method is applied in an environment where said object management and delivery system can store an object record as a low resolution record containing data corresponding to a low resolution object image, or as a higher resolution record containing data corresponding to a higher resolution object image, and wherein, in performing said retrieving step, an attempt is made first to retrieve an object data record having the same resolution as the resolution of image monitor means upon which the desired object image is to be displayed, and if an object data record having said same resolution is not available, retrieving an object data record at a different resolution and processing object data of said object data record to obtain object data at said same resolution.

10. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a print operation, and wherein said providing and transferring steps further comprise the steps of:

entering, at said data terminal means, a print request indicating a particular object to be printed and sending said request to said host computing means;

generating a permanent object name corresponding to said particular object and transferring said name together with a print command from said host computing means to said object management and delivery system;

retrieving an object data record corresponding to said permanent image name and transferring said record to said object management and delivery system which is associated with said data terminal means which was used to enter said print request; and delivering said object data record and printing an object image at an image printer means which is associated with said data terminal means which was used to enter said print request.

11. A method as claimed in claim 10, wherein said method is applied in an environment where there is a plurality of respective host computing means each associated with a respective object management and delivery system, wherein, if a desired object data record is stored in a remote object management and delivery system which is not associated with the requesting said data terminal means, a data retrieving operation of said retrieving step is conducted with respect to said remote object management and delivery system.

12. A method as claimed in claim 10, wherein said method is applied in an environment where said object management and delivery system can store an object record as a low resolution record containing data corresponding to a low resolution object image or, a high resolution record containing data corresponding to a high resolution object image, and wherein said retrieving step is performed by retrieving a high resolution record corresponding to said permanent object name and then processing object data of said image data record to obtain object data at a print resolution.

13. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with a least one of said image terminal means, said memory storage means and said scanner means;

wherein an operation to be performed is a print operation, and wherein said providing and transferring steps further comprise the steps of:

entering, at said image terminal means, a print request indicating a particular object to be printed;

generating a permanent object name corresponding to said particular object and transferring said name together with a print command from said host computing means to said object management and delivery system;

retrieving an object data record corresponding to said permanent object name and transferring said record to said object management and delivery system which is associated with said image terminal means which was used to enter said print request; and delivering said image data record and printing an object image at an image printer means which is associated with said image terminal means which was used to enter said print request.

14. A method as claimed in claim 13, wherein said method is applied in an environment where there is a plurality of respective host computing means each associated with a respective object management and delivery system, wherein, if a desired object data record is stored in a remote object management and delivery system which is not associated with the requesting said image terminal means, a data retrieving operation of said retrieving step is conducted with respect to said remote object management and delivery system.

15. A method as claimed in claim 13, wherein said method is applied in an environment where said object management and delivery system can store an object record as a low resolution record containing data corresponding to a low resolution object image, or as a higher resolution record containing data corresponding to a higher resolution object image, and wherein said retrieving step is performed by retrieving a higher resolution record corresponding to said permanent object name and then processing object data of said object data record to obtain object data at a print resolution.

16. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a modify operation, and wherein said providing and transferring steps further comprise the steps of:

entering, at said data terminal means, a modify request indicating a particular object to be modified and sending said request to said host computing means;

generating a permanent object name corresponding to said particular object and transferring said name together with a modify command from said host computing means to said object management and delivery system;

retrieving an object data record corresponding to said permanent object name and transferring said record to said object management and delivery system which is associated with said data terminal means which was used to enter said modify request;

delivering and modifying said object data record at an image terminal means which is associated with said data terminal means which was used to enter said modify request; and sending the modified said object data record to said object management and delivery system, and storing modified said object data record in said memory storage means as a modified object data record, said modified object data record being associated with a modified permanent object name.

17. A method as claimed in claim 16, wherein said method is applied in an environment where there is a plurality of respective host computing means each associated with a respective object management and delivery system, wherein, if a desired object data record is stored in a remote object system means which is not associated with the requesting said data terminal means, a data retrieving operation of said retrieving step is conducted with respect to said object management and delivery system.

18. A method as claimed in claim 16, wherein said method is applied in an environment where said object management and delivery system can store an object record as a low resolution record containing data corresponding to a low resolution object image, or as a higher resolution record containing data corresponding to a higher resolution object image, and wherein said generating step and steps recited thereafter are conducted a first time to modify a low resolution record and a second time to modify a higher resolution record.

19. A method as claimed in claim 18 comprising the further step of:

having said object management and delivery system notify said host computing system of said modified image data record which has been stored.

20. In a data processing system for storing a plurality of electronic object data records, and displaying and reproducing a desired object using said data records, said data processing system comprising host computing means including data terminal means, and an object management and delivery system having object management means, memory storage means, image terminal means and scanner means, a method which allows said data processing system to perform a desired object-related operation with only a modicum of interaction between the operations of said host computing means and said object management and delivery system, said method comprising the steps of:

providing an object-related request from one of said data terminal means and said image terminal means; and transferring said object-related request to said object management means of said data processing system and performing an object-related operation in conjunction with at least one of said image terminal means, said memory storage means and said scanner means;

wherein an operation to be performed is a modify operation, and wherein said providing and transferring steps further comprise the steps of:

entering, at said data terminal means, a modify request indicating a particular object to be modified and sending said request to said host computing means;

retrieving temporary object identification characters from said host computing means and posting said characters onto new object pages which are to be scanned;

generating a permanent object name in said host computing means and transferring said name together with said temporary object identification characters from said host computing means to said object management and delivery system to flag a modify authorization;

entering temporary object identification characters at image terminal means for new object pages to be scanned, and sending the entered characters to said object management and delivery system to verify modify authorization;

retrieving, once a storage authorization has been verified, an object data record corresponding to said permanent object name and transferring said record to said image terminal means which was used to enter said temporary object identification characters;

scanning said new object pages with said scanning means to produce object data corresponding to said object, and adding said produced object data to object data from said object data record resulting in modified object data; and sending modified said object data to said object management and delivery system and storing modified said object data in said memory storage means as a modified object data record, said modified object data record being associated with a modified permanent object name.

21. A method as claimed in claim 20, wherein said method is applied in an environment where there is a plurality of respective host computing means each associated with a respective object management and delivery system, wherein, if a desired image data record is stored in a remote object management and delivery system which is not associated with the requesting said data terminal means, a data retrieving operation of said retrieving step is conducted with respect to said object management and delivery system.

22. A method as claimed in claim 20, wherein said method is applied in an environment where there is a plurality of and delivery system can store an object record as a low resolution record containing data corresponding to a low resolution object image, or as a higher resolution record containing data corresponding to a higher resolution object image, and wherein said generating step and steps recited thereafter are conducted a first time to modify a low resolution record and a second time to modify a higher resolution record.

23. A method as claimed in claim 20 comprising the further step of:

having said object management and delivery system notify said host computing system of said modified object data record which has been stored.

24. In a data processing system for storing and displaying digital images, including an image terminal having a document scanner and a keyboard, said image terminal being coupled to an object management and delivery system, a data terminal coupled to a file management system, a storage manager coupled to and controlling first and second image storage means, wherein said object management and delivery system is connected to said file management system and said storage manager, a method for storing an image and comprising the steps of:

inputting temporary object identification characters into said data terminal to identify an image;

generating a permanent object name in said file management system to said image by using said temporary object identification characters;

transmitting said permanent object name to said object management and delivery system;
storing said permanent object name in said object management and delivery system;
inputting said temporary object identification characters into said image terminal;
transmitting said temporary object identification characters to said object management and delivery system;
retrieving said permanent object name stored in said object management and delivery system;
inputting said image into said image terminal by converting it to an image data stream at said document scanner;
transmitting said image data stream to said object management and delivery system;
transmitting said permanent object name and said image data stream to said storage manager;
storing said permanent object name and said image data stream in said first storage means; and sending a register command to said file management system indicating that said image has been stored.

* * * * *

UNITED STATES PATENT AND TRADEMARK OFFICE
CERTIFICATE OF CORRECTION

PATENT NO. : 5,058,185
DATED : October 15, 1991
INVENTOR(S) : H.M. Morris, et. al.

It is certified that error appears in the above-indentified patent and that said Letters Patent is hereby corrected as shown below:

On the Title page, item [75], inventors should include --Robert E. Probst, Reston, VA--.

Signed and Sealed this

Seventh Day of September, 1993

Attest:

BRUCE LEHMAN

*Attesting Officer*  *Commissioner of Patents and Trademarks*